United States Patent
Rippel et al.

(10) Patent No.: US 9,985,500 B2
(45) Date of Patent: May 29, 2018

(54) INDUCTION MOTOR WITH TRANSVERSE LIQUID COOLED ROTOR AND STATOR

(71) Applicant: PRIPPELL TECHNOLOGIES, LLC, Los Angeles, CA (US)

(72) Inventors: Wally E. Rippel, Altadena, CA (US); Eric E. Rippel, Los Angeles, CA (US)

(73) Assignee: Prippell Technologies, LLC, Los Angeles, CA (US)

( * ) Notice: Subject to any disclaimer, the term of this patent is extended or adjusted under 35 U.S.C. 154(b) by 192 days.

(21) Appl. No.: 14/662,765

(22) Filed: Mar. 19, 2015

(65) Prior Publication Data
US 2015/0280525 A1    Oct. 1, 2015

Related U.S. Application Data

(60) Provisional application No. 61/971,421, filed on Mar. 27, 2014, provisional application No. 62/091,276, filed on Dec. 12, 2014.

(51) Int. Cl.
*H02K 7/08* (2006.01)
*H02K 9/19* (2006.01)
(Continued)

(52) U.S. Cl.
CPC ............... *H02K 9/19* (2013.01); *H02K 1/20* (2013.01); *H02K 1/32* (2013.01); *H02K 5/20* (2013.01); *H02K 9/197* (2013.01); *H02K 9/24* (2013.01)

(58) Field of Classification Search
CPC .. H02K 1/20; H02K 1/32; H02K 5/20; H02K 7/085; H02K 9/19; H02K 9/197; H02K 9/24
(Continued)

(56) References Cited

U.S. PATENT DOCUMENTS

| | | |
|---|---|---|
| 1,877,904 A | 9/1932 | Laffoon |
| 2,433,660 A | 12/1947 | Granfield |

(Continued)

FOREIGN PATENT DOCUMENTS

| | | |
|---|---|---|
| CN | 102538562 B | 8/2013 |
| EP | 1 168 572 A2 | 1/2002 |

(Continued)

OTHER PUBLICATIONS

Invitation to Pay Additional Fees and, where Application, Protest Fee for PCT Application No. PCT/US2015/021453, dated Jun. 15, 2015, 9 pages.

(Continued)

*Primary Examiner* — John K Kim
(74) *Attorney, Agent, or Firm* — Lewis Roca Rothgerber Christie LLP

(57) ABSTRACT

An electric machine with fluid cooling. The electric machine includes a stator, the stator having a stator winding and a stator core having a plurality of stacked magnetic laminations, each of the laminations of the stator core having a plurality of apertures overlapping to form a plurality of stator fluid channels, a stator fluid channel of the plurality of stator fluid channels being not entirely axial. The electric machine further includes a rotor, the rotor having a shaft and a rotor core having a plurality of stacked magnetic laminations, each of the laminations of the rotor core having a plurality of apertures overlapping to form a plurality of rotor fluid channels, and a rotary fluid coupling in fluid communication with the rotor fluid channels. The rotor and the stator are configured to form a magnetic circuit comprising an air gap between the rotor and the stator.

36 Claims, 15 Drawing Sheets

(51) Int. Cl.
*H02K 1/20* (2006.01)
*H02K 1/32* (2006.01)
*H02K 5/20* (2006.01)
*H02K 9/24* (2006.01)
*H02K 9/197* (2006.01)

(58) Field of Classification Search
USPC .................................................. 310/54, 216
IPC ............................................... H02K 7/08,9/19
See application file for complete search history.

(56) References Cited

U.S. PATENT DOCUMENTS

| | | | |
|---|---|---|---|
| 2,774,000 A | 12/1956 | Ross | |
| 2,792,511 A | 5/1957 | Horstman | |
| 3,165,655 A | 1/1965 | Eis | |
| 3,206,964 A | 9/1965 | Hart et al. | |
| 3,288,209 A | 11/1966 | Wall et al. | |
| 3,447,002 A | 5/1969 | Ronnevig | |
| 3,498,370 A | 3/1970 | Baggs | |
| 3,597,645 A | 8/1971 | Duffert | |
| 3,827,141 A | 8/1974 | Hallerback | |
| 3,896,320 A | 7/1975 | Moffatt | |
| 4,208,597 A | 6/1980 | Mulach et al. | |
| 4,672,252 A | 6/1987 | Spirk | |
| 4,993,487 A | 2/1991 | Niggemann | |
| 5,325,684 A | 7/1994 | Stierlin et al. | |
| 5,859,482 A | 1/1999 | Crowell et al. | |
| 6,727,609 B2* | 4/2004 | Johnsen | H02K 1/32 310/52 |
| 6,954,010 B2 | 10/2005 | Rippel et al. | |
| 7,057,324 B2 | 6/2006 | Breznak et al. | |
| 7,851,966 B2 | 12/2010 | Rippel | |
| 8,242,646 B2* | 8/2012 | Tatematsu | B60L 3/0061 310/52 |
| 8,405,262 B1 | 3/2013 | Beatty et al. | |
| 8,686,608 B2* | 4/2014 | Lendenmann | H02K 1/325 310/61 |
| 9,041,261 B2* | 5/2015 | Yamamoto | H02K 1/2766 310/156.53 |
| 2002/0130582 A1* | 9/2002 | Oketani | H02K 3/345 310/216.004 |
| 2003/0030333 A1* | 2/2003 | Johnsen | H02K 1/32 310/54 |
| 2005/0115699 A1 | 6/2005 | Nuris et al. | |
| 2007/0013241 A1 | 1/2007 | Schiferl et al. | |
| 2009/0015112 A1* | 1/2009 | Binder | F16C 19/52 310/68 R |
| 2009/0113696 A1 | 5/2009 | Holmes | |
| 2009/0195092 A1 | 8/2009 | Gagnon | |
| 2009/0195108 A1 | 8/2009 | Rippel | |
| 2011/0094720 A1 | 4/2011 | Wang et al. | |
| 2011/0133580 A1 | 6/2011 | Sugimoto et al. | |
| 2011/0254391 A1 | 10/2011 | Elender et al. | |
| 2012/0080964 A1 | 4/2012 | Bradfield | |
| 2012/0080983 A1 | 4/2012 | Iund | |
| 2012/0086291 A1* | 4/2012 | DeBlock | H02K 1/20 310/61 |
| 2012/0222289 A1* | 9/2012 | Nagai | H02K 1/276 29/598 |
| 2012/0267971 A1 | 10/2012 | Husum et al. | |
| 2013/0049496 A1 | 2/2013 | Chamberlin et al. | |
| 2013/0069455 A1 | 3/2013 | Hamer et al. | |
| 2013/0076168 A1* | 3/2013 | Memminger | H02K 5/20 310/54 |
| 2013/0113311 A1 | 5/2013 | Downing et al. | |
| 2013/0119816 A1 | 5/2013 | Yang et al. | |
| 2013/0221772 A1* | 8/2013 | Miyamoto | H02K 9/19 310/54 |
| 2013/0313928 A1* | 11/2013 | McKinzie | H02K 1/32 310/54 |
| 2014/0042841 A1 | 2/2014 | Rippel et al. | |
| 2014/0054987 A1 | 2/2014 | Miyamoto et al. | |
| 2015/0280525 A1* | 10/2015 | Rippel | H02K 9/19 310/54 |
| 2016/0025421 A1 | 1/2016 | Rippel et al. | |
| 2016/0087509 A1 | 3/2016 | Rippel et al. | |

FOREIGN PATENT DOCUMENTS

| | | |
|---|---|---|
| GB | 2484386 A | 4/2012 |
| JP | 59-041161 A | 3/1984 |
| JP | 60-174445 U | 11/1985 |
| JP | 60-174445 U1 | 11/1985 |
| JP | 62-081954 A | 4/1987 |
| JP | H 10-271716 | 10/1998 |
| JP | 10-336965 A | 12/1998 |
| JP | 2000-232740 A | 8/2000 |
| JP | 2002-34206 A | 1/2002 |
| JP | 2002-034206 A | 1/2002 |
| JP | 2002-165410 A | 6/2002 |
| JP | 2003-134701 A | 5/2003 |
| JP | 2003-324871 A | 11/2003 |
| JP | 2004-215495 A | 7/2004 |
| JP | 2004-236495 A | 8/2004 |
| JP | 2005-333697 A | 12/2005 |
| JP | 2007-209070 A | 8/2007 |
| JP | 2007-312580 A | 11/2007 |
| JP | 2008-109817 A | 5/2008 |
| JP | 2011-120402 A | 6/2011 |
| JP | 2011-234505 A | 11/2011 |
| JP | 2011-254571 A | 12/2011 |
| JP | 2014-45586 A | 3/2014 |
| JP | 2014-045586 A | 3/2014 |
| WO | WO 01/05015 A2 | 1/2001 |

OTHER PUBLICATIONS

International Search Report and Written Opinion for International Application No. PCT/US2015/021453, dated Aug. 14, 2015, 19 pages.
U.S. Appl. No. 15/010,879, Rippel et al.
International Search Report and Written Opinion for related International Patent Application No. PCT/US2015/050649; dated Dec. 10, 2015 (11 pages).
International Search Report and Written Opinion for related International Patent Application No. PCT/US2015/041824, dated Oct. 23, 2015 (9 pages).
International Search Report and Written Opinion for related International Patent Application No. PCT/US2016/015700, dated Apr. 1, 2016 (9 pages).
Japanese Office action for Patent Application No. 2017-502757, dated Aug. 2, 2017, with English Translation, 9 pages.
Korean Office action, and English Translation of Grounds for Rejection of Korean Office action, for Patent Application No. 10-2016-7029925, dated Sep. 18, 2017, 15 pages.

* cited by examiner

SECTION A-A

INDUCTION MOTOR WITH TRANSVERSE LIQUID COOLED ROTOR AND STATOR

CROSS-REFERENCE TO RELATED APPLICATION(S)

The present application claims priority to and the benefit of U.S. Provisional Application No. 61/971,421, filed Mar. 27, 2014, entitled "INDUCTION MOTOR WITH TRANSVERSE LIQUID COOLED ROTOR AND STATOR", and priority to and the benefit of U.S. Provisional Application No. 62/091,276, filed Dec. 12, 2014, entitled "INDUCTION MOTOR WITH TRANSVERSE LIQUID COOLED ROTOR AND STATOR", the entire contents of both of which are incorporated herein by reference.

FIELD

One or more aspects of embodiments according to the present invention relate to electric motors, and more particularly to a system for cooling of an electric machine.

BACKGROUND

The power to mass ratio (specific power) is an important metric for electric motors, especially for those used to power electric and hybrid vehicles. As specific power is increased, motor mass can be reduced while maintaining a given level of performance. This provides both direct and indirect economic benefits.

Power is equal to the product of shaft speed and torque, and power (and hence specific power) may be increased by increasing both speed and torque. For speed, the ultimate limit is where centrifugal stress causes the rotor to mechanically fail. This limit is different for different motor types. For induction motors, the rotor structure is relatively strong and hence relatively high speeds can be safely tolerated. Rotor surface speeds of 150 m/sec may be possible for some designs.

The ultimate torque limit is also different for different motor types. The torque limit may be proportionate to the square of the gap magnetic flux density. Other factors also affect the torque. In the case of induction motors, leakage inductance is a factor; peak torque may vary inversely with this parameter. Hence, for induction motors, higher specific torque is achieved by reducing the leakage inductance.

Iron losses are produced which are approximately proportionate to the square of the electrical frequency. Since speed (rpm) is proportionate to the electrical frequency, it follows that iron losses vary approximately with the square of the shaft speed. Likewise, conductor losses are approximately proportionate with current. In turn, torque is approximately proportionate to current (under conditions of maximum magnetic flux density). Hence, conductor losses vary approximately with the square of the torque. It therefore follows that if speed and torque are maintained proportionate to each other, efficiency remains constant. Thus, for example, if both speed and torque are doubled, both the loss and through-power increase by a factor of four, while efficiency remains approximately constant. Heat transfer, however, must also be increased by a factor of four. Thus, there is a need for a system for providing effective cooling in an electric motor.

SUMMARY

Aspects of embodiments of the present disclosure are directed toward a system and method for cooling an induction motor which enables continuous specific power levels in excess of 10 kW/kg for machines in the range of 10 kW to 1000 kW. To achieve these very high specific power levels, rotor surface speeds are maintained on the order of 120 m/sec with stator and rotor current densities on the order of 1500 A/cm$^2$. The resulting conductor and iron specific losses are respectively on the order of 5 W/cm$^3$ and 1 W/cm$^3$. In order to handle these high levels of heat production, the required specific heat transfer is on the order of 0.1 W/cm$^3$/° C. (averaged over the machine active volume). Heat is removed using a system and method of liquid cooling, termed "transverse lamination cooling", in which fluid (i.e., coolant) flows transversely through narrow regions formed by apertures in every other magnetic lamination. The required levels of heat transfer may be achieved using oil (ATF or transformer oil) as the fluid.

According to an embodiment of the present invention there is provided an electric machine, including: a stator, the stator having a stator winding and a stator core having a plurality of stacked magnetic laminations, each of the laminations of the stator core having a plurality of apertures overlapping to form a plurality of stator fluid channels, a stator fluid channel of the plurality of stator fluid channels being not entirely axial; a rotor, the rotor having a shaft and a rotor core having a plurality of stacked magnetic laminations, each of the laminations of the rotor core having a plurality of apertures overlapping to form a plurality of rotor fluid channels; and a rotary fluid coupling in fluid communication with the rotor fluid channels, wherein the rotor and the stator are configured to form a magnetic circuit including an air gap between the rotor and the stator.

In one embodiment, a plurality of the apertures of the laminations of the stator core falls on a helix coaxial with the shaft, and/or a plurality of the apertures of the laminations of the rotor core falls on a helix coaxial with the shaft.

In one embodiment, a rotor fluid channel of the plurality of rotor fluid channels is not entirely axial.

In one embodiment, the machine includes at least one of a stator manifold, the stator manifold having a stator manifold fluid channel in fluid communication with the stator fluid channels, and a rotor manifold, the rotor manifold having a rotor manifold fluid channel in fluid communication with the rotor fluid channels.

In one embodiment, a lamination of the stator core includes a first aperture and a second aperture, the first aperture differing in shape and/or in size from the second aperture, and/or a lamination of the rotor core includes a first aperture and a second aperture, the first aperture differing in shape and/or in size from the second aperture.

In one embodiment, at least one of the rotor core and the stator core includes: a first lamination having a first axial orientation and a plurality of substantially identical first apertures; and a second lamination having a second axial orientation and a plurality of substantially identical second apertures, wherein one of the first apertures differs in shape and/or size from one of the second apertures, and/or the first axial orientation differs from the second axial orientation.

In one embodiment, each of the rotor core and the stator core includes: a first lamination having a first axial orientation and a plurality of substantially identical first apertures; and a second lamination having a second axial orientation and a plurality of substantially identical second apertures, wherein one of the first apertures differs in shape and/or size from one of the second apertures, and/or the first axial orientation differs from the second axial orientation.

In one embodiment, at least one of the stator core and the rotor core comprises: a first lamination having an aperture;

and a second lamination adjacent to the first lamination, the second lamination having an aperture differing in size and/or shape from the aperture of the first lamination.

In one embodiment, at least one of the rotor core and the stator core includes: a first lamination; and a second lamination adjacent to, substantially identical to, and having substantially the same axial orientation as, the first lamination.

In one embodiment, a first lamination of the laminations of the stator is substantially identical to a second lamination of the laminations of the stator, and/or a first lamination of the laminations of the rotor is substantially identical to a second lamination of the laminations of the rotor.

In one embodiment, the machine includes a flow director secured to the stator core and/or a flow director secured to the rotor core.

In one embodiment, the machine includes at least one of: a flow director having a protrusion extending into an aperture of a lamination of the rotor and a flow director having a protrusion extending into an aperture of a lamination of the stator.

In one embodiment, the rotor core includes a first lamination at one end of the rotor core and a second lamination, the first lamination having at least one aperture and the second lamination having an aperture not overlapping any aperture of the first lamination, and/or the stator core includes a first lamination at one end of the stator core and a second lamination, the first lamination having at least one aperture and the second lamination having an aperture not overlapping any aperture of the first lamination.

In one embodiment, at least one of the rotor core and the stator core includes: a first lamination, having at least one aperture, at a first end of the core; and a second lamination, having at least one aperture, at an end of the core opposite the first end, the second lamination having an aperture not overlapping any aperture of the first lamination, and the first lamination having an aperture not overlapping any aperture of the second lamination.

In one embodiment, the stator core includes an electrically insulating resin having a thermal conductivity greater than about 0.4 W/m/° C., the resin filling, with a void fraction less than about 10%: a space between the stator core and the stator winding, and/or a space between the stator manifold and an end turn of the stator winding.

In one embodiment, the stator manifold is in fluid communication with the rotary fluid coupling.

In one embodiment, the stator manifold fluid channel includes a plurality of stacked stator manifold cooler laminations, wherein each of the stator manifold cooler laminations has a plurality of stator cooler apertures, the stator cooler apertures overlapping to form a plurality of stator manifold cooler fluid channels.

In one embodiment, a stator manifold cooler fluid channel of the plurality of stator manifold cooler fluid channels is not entirely axial.

In one embodiment, the machine includes: a rotor manifold, the rotor manifold having a rotor manifold fluid channel in fluid communication with the rotor fluid channels, wherein the rotor manifold fluid channel has an interior structure configured to enhance heat transfer between the rotor manifold and a fluid in the rotor manifold fluid channel, wherein the rotor further includes a rotor cage having a plurality of axial bars and two end rings, and wherein the rotor manifold has a protrusion which is embedded within an end ring of the two end rings.

In one embodiment, the rotor manifold has a protrusion, a recess, or a hole, configured to secure balancing material.

In one embodiment, the machine includes: a bearing configured to support an end of the shaft; and an end bell configured to support the bearing, wherein the bearing does not form a part of an electrically conductive path between the shaft and the end bell.

In one embodiment, an external surface of the stator core and/or an external surface of the rotor core is sealed with a resin.

In one embodiment, the machine includes an enclosure enclosing the stator core, the enclosure being configured to prevent leakage of fluid from the machine.

In one embodiment, the machine includes a fluid in the stator fluid channels and in the rotor fluid channels, the fluid being selected from the group consisting of: automatic transmission fluids, transformer oils, and water-based solutions.

In one embodiment, the machine includes a scavenge pump configured to return leaked fluid to a main fluid circuit.

According to an embodiment of the present invention there is provided a electric machine, including: a rotor; a stator; first cooling means for cooling the stator; and second cooling means for cooling the rotor, wherein the first cooling means includes a plurality of stator fluid channels, one of the stator fluid channels being not entirely axial, and wherein the second cooling means includes a plurality of rotor fluid channels.

According to an embodiment of the present invention there is provided a electric machine including: a stator, including: a stator winding; and a stator core including a plurality of stacked magnetic stator laminations, each of the stator laminations having a plurality of stator apertures, the stator apertures overlapping to form a plurality of stator fluid channels, a fluid channel of the plurality of stator fluid channels being not entirely axial; a rotor, including: a shaft; and a rotor core including a plurality of stacked magnetic rotor laminations, each of the rotor laminations having a plurality of rotor apertures, the rotor apertures overlapping to form a plurality of rotor fluid channels, a fluid channel of the plurality of rotor fluid channels being not entirely axial; and a rotary fluid coupling in fluid communication with the rotor fluid channels; an end bell secured to an end of the stator, the end bell including a feature configured to secure balancing putty; a bearing supported by the end bell and configured to support an end of the shaft, the bearing including an inner race, an outer race and a non-conductive element, the inner race being insulated from the outer race; a stator manifold including a stator manifold fluid channel in fluid communication with the stator fluid channels and in fluid communication with the rotary fluid coupling; a rotor manifold including a rotor manifold fluid channel in fluid communication with the rotary fluid coupling and with the rotor fluid channels; and a scavenge pump configured to return leaked fluid to a main fluid circuit.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of an induction motor with transverse liquid cooled rotor and stator provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
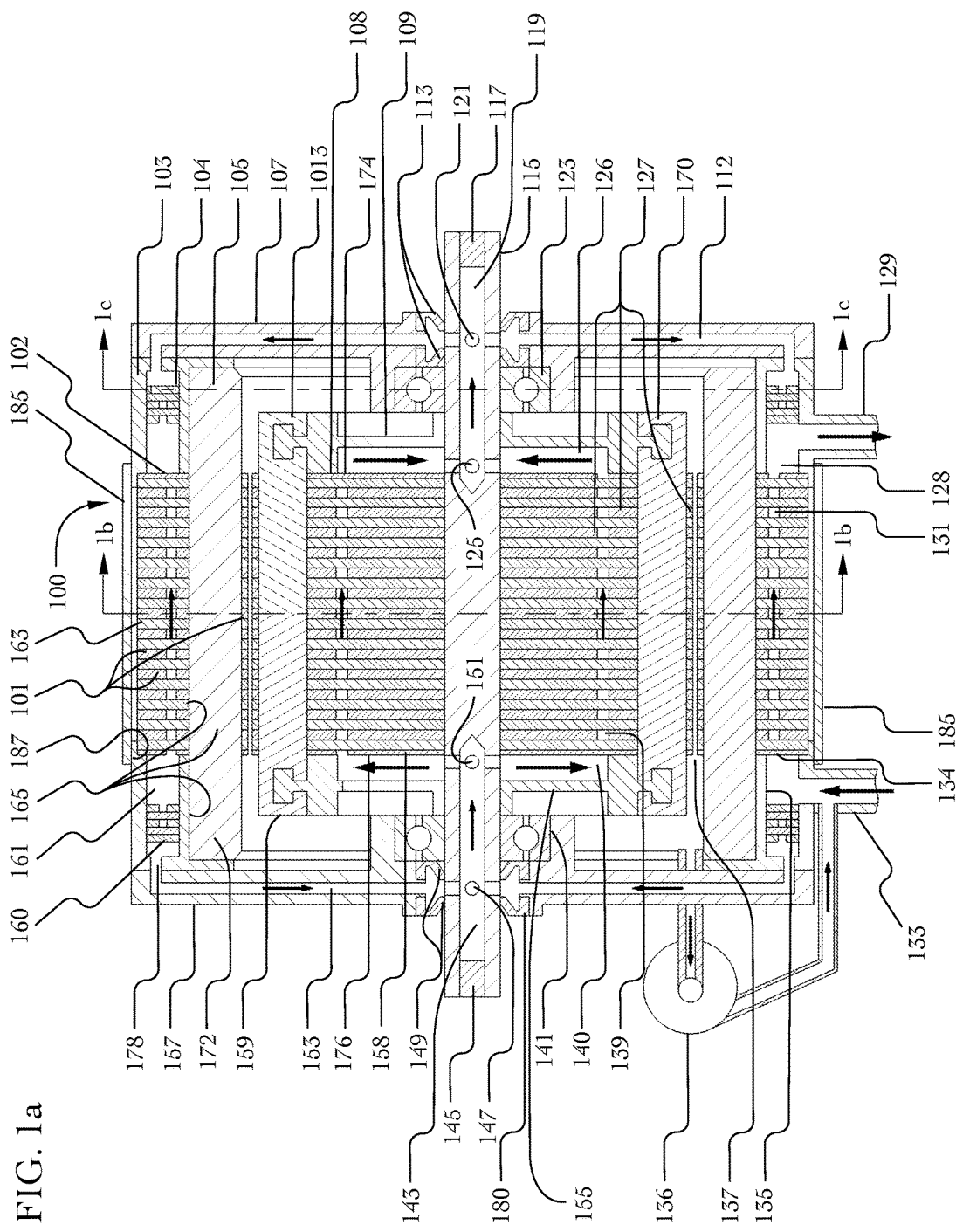
FIG. 1a is an axial section view of a motor, according to an embodiment of the present invention.
Figure 1B:
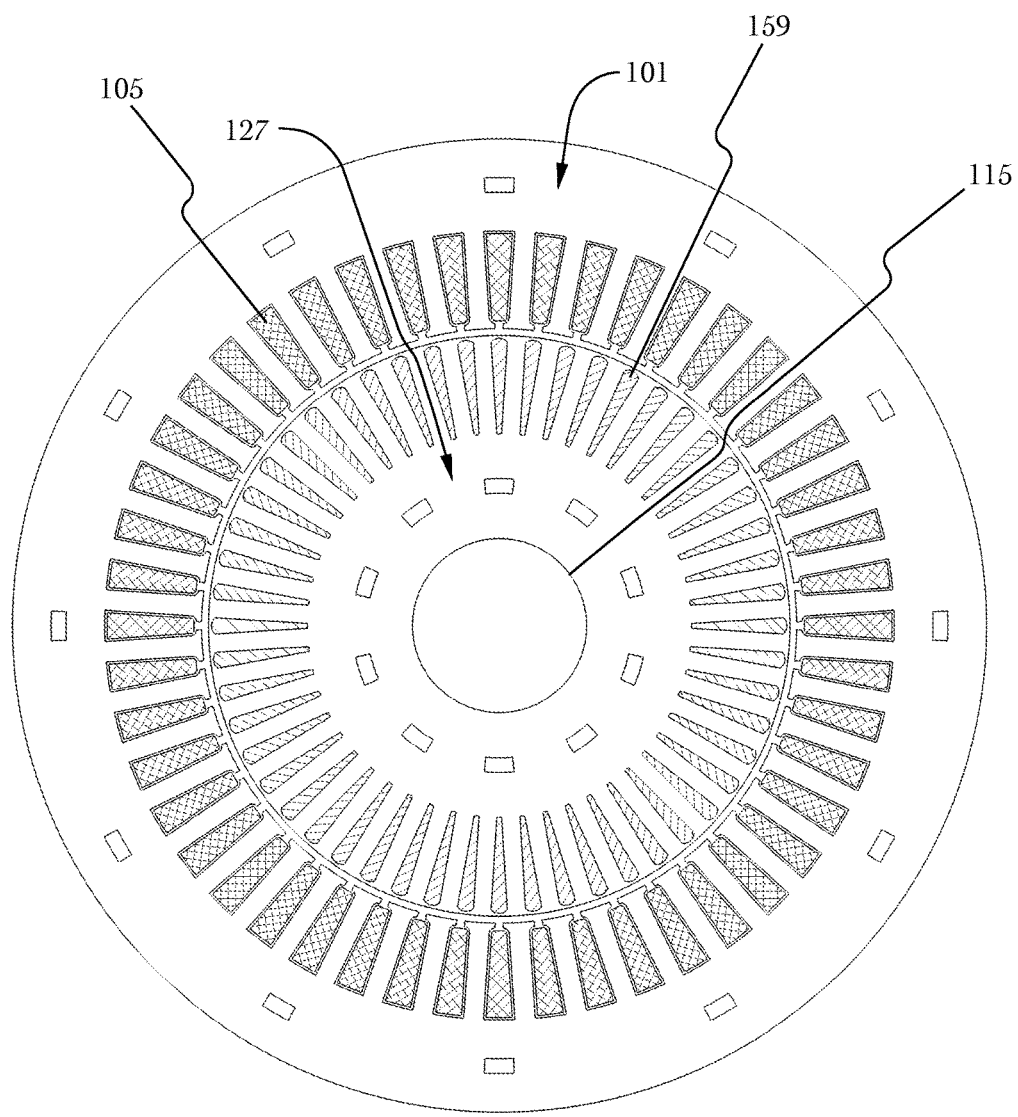
FIG. 1b is a transverse section view of the motor taken along line 1b-1b of FIG. 1, according to an embodiment of the present invention.
Figure 1C:
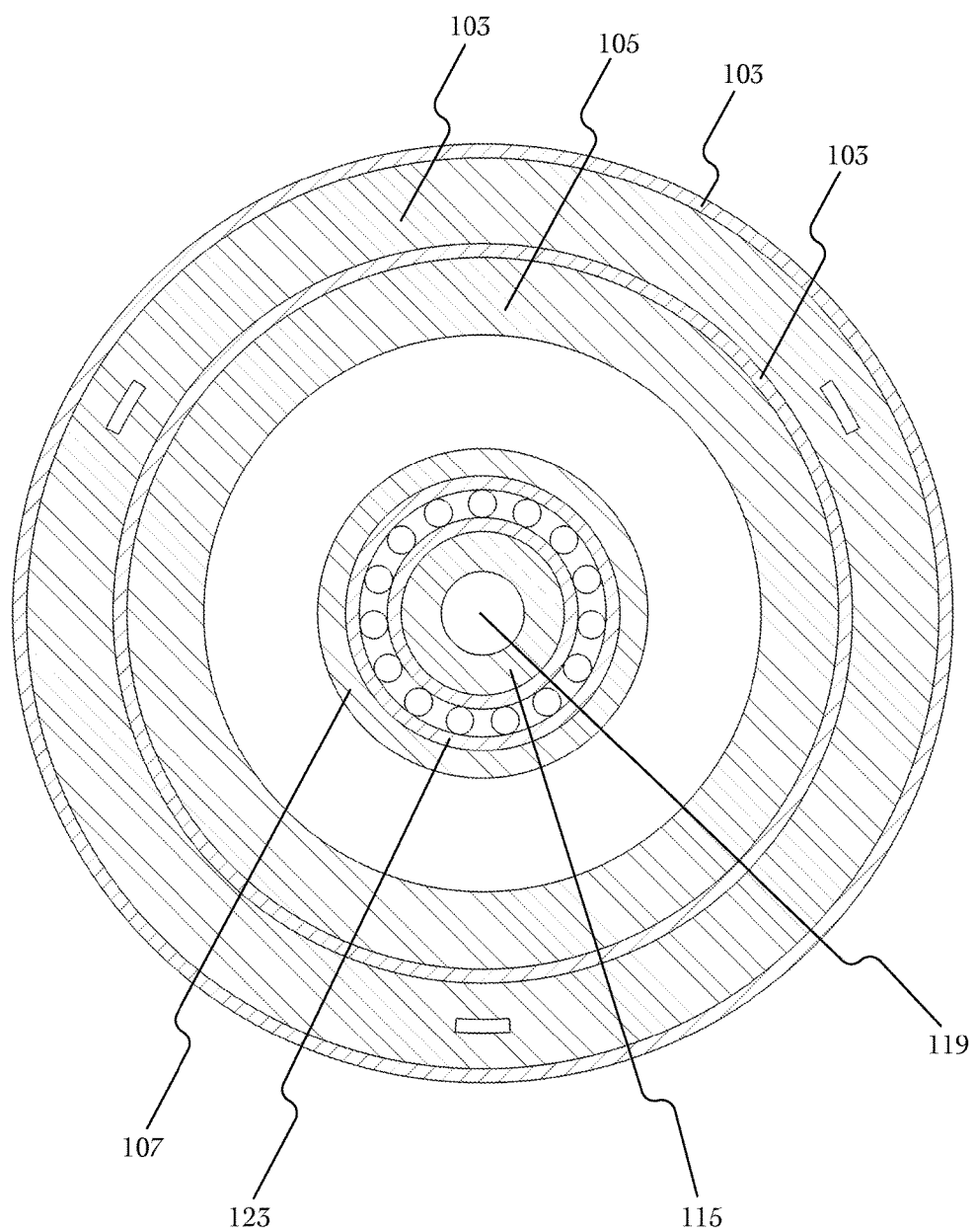
FIG. 1c is a transverse section view of the motor taken along line 1c-1c of FIG. 1, according to an embodiment of the present invention.

FIG. 1a is an axial section view of an electric machine 100, e.g., an induction motor including a stator 163 and a rotor 170. In one embodiment a motor has two parallel fluid flow circuits—one for the stator core 101 and one for the rotor core 127. In another embodiment, the respective fluid flow circuits for the stator core 101 and for the rotor core 127 may be arranged to be in series. The stator 163 includes a laminated stator core 101 with winding 105, front and rear stator manifolds, 103 and 135, and front and rear stator manifold coolers 104 and 160. The rotor 170 includes a laminated rotor core 127 with cage 159, front and rear rotor manifolds 109 and 155, and partly hollow shaft 115. The motor further includes front and rear end bells 107 and 157, front and rear rotary shaft seals 113 and 149, and front and rear bearings 123, 141. An air gap 137 separates the rotor core 127 and the stator core 101. In one embodiment at least one of the stator manifolds is an integral part of the respective end bell. FIGS. 1b and 1c show transverse sections through the motor, at the center of the motor (FIG. 1b), and at a cutting plane passing through an end turn, a stator manifold, and a bearing (FIG. 1c).

The stator manifolds 103, 135 serve five functions—to distribute fluid flow to and from the stator fluid passages 131, to transfer fluid to and from rotor fluid passages 139 via fluid channels 112, 153 in the end bells 107, 157, to transfer heat from the winding end turns 172 to the fluid, to provide axial compression for the stator core 101, and to locate and secure the end bells. Rotor manifolds 109, 155, attached to each face 174, 176 of the rotor core, serve five functions—to distribute fluid flow to and from the rotor fluid passages 139, to transfer heat from the end rings 1310 to the fluid, to mechanically reinforce the end rings 1310, to provide axial compression for the rotor core 127, and to provide a means for dynamic balancing. End bells 107, 157 each serve three functions—to provide bearing support, to provide channels for fluid flow between stator manifold ports 178 and fluid couplings 180, and to house the fluid couplings 180.

Figure 2:
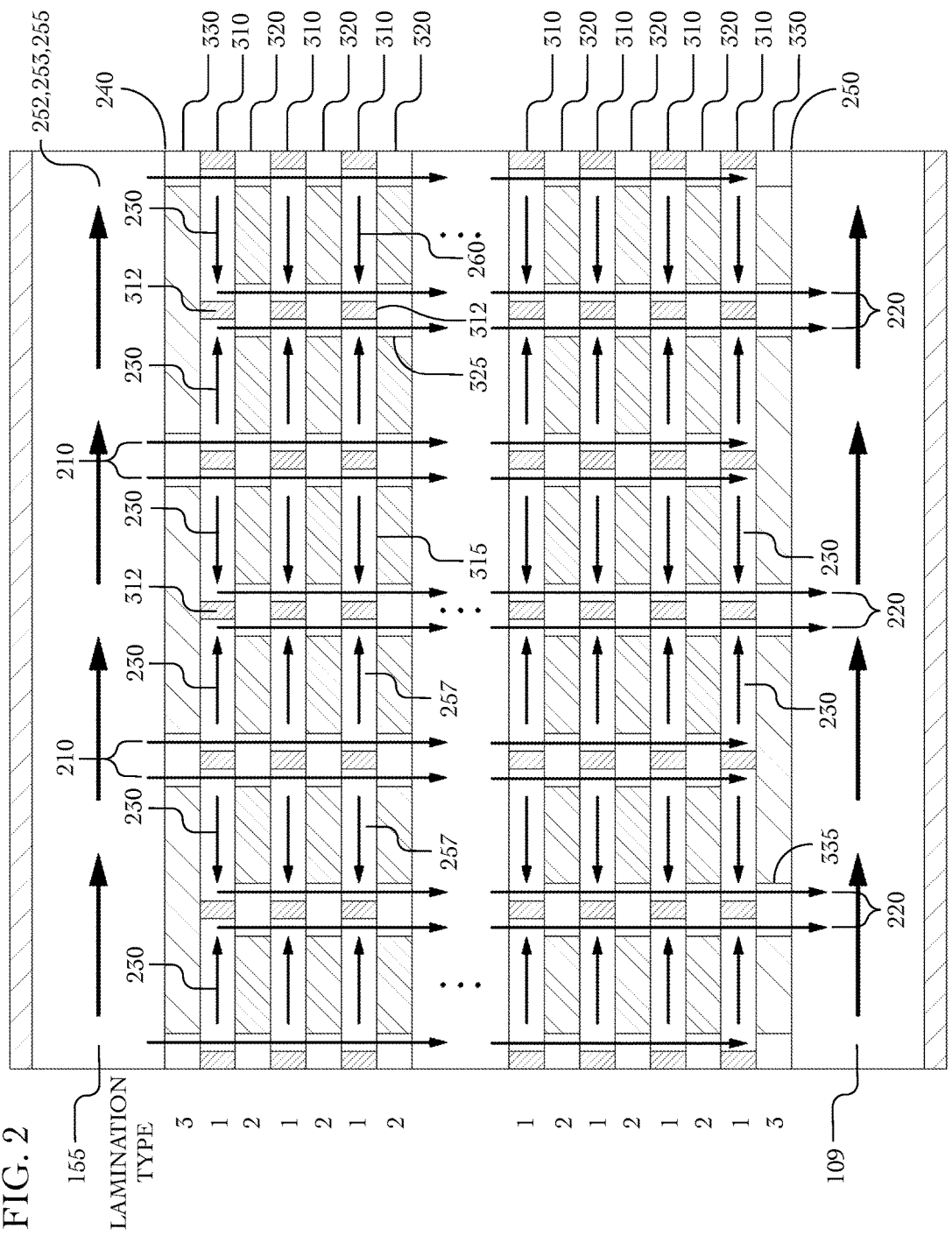
FIG. 2 is a schematic section view of a lamination structure depicting fluid flow, according to an embodiment of the present invention.
Figure 3A:
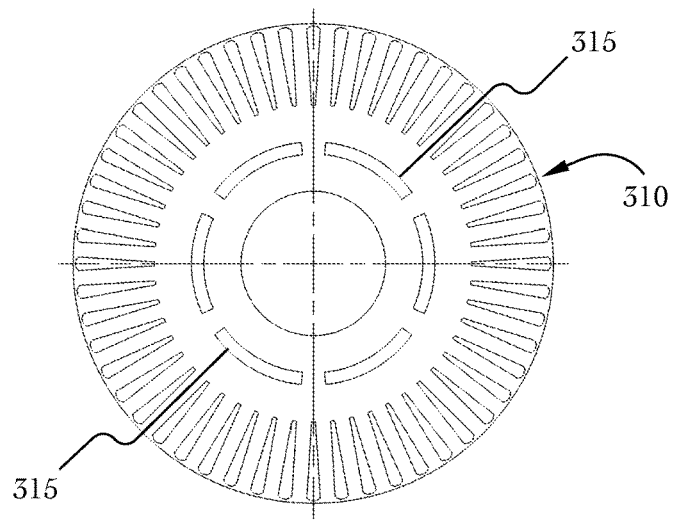
FIG. 3a is a plan view of a first rotor lamination type, according to an embodiment of the present invention.
Figure 3B:
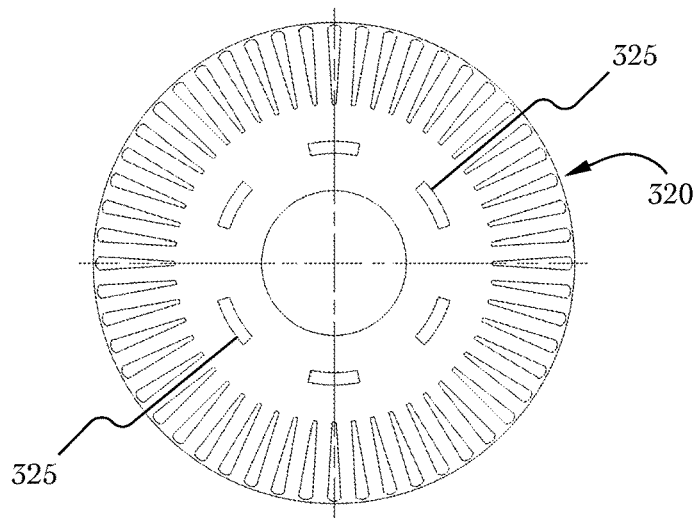
FIG. 3b is a plan view of a second rotor lamination type, according to an embodiment of the present invention.
Figure 3C:
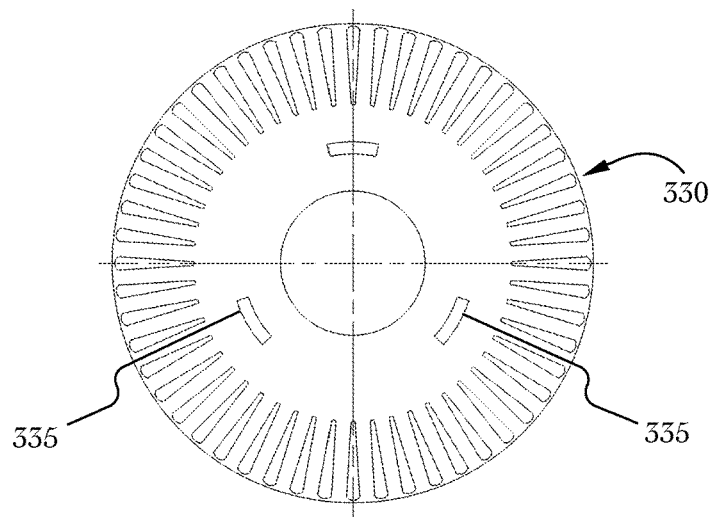
FIG. 3c is a plan view of a third rotor lamination type, according to an embodiment of the present invention.
Figure 4:
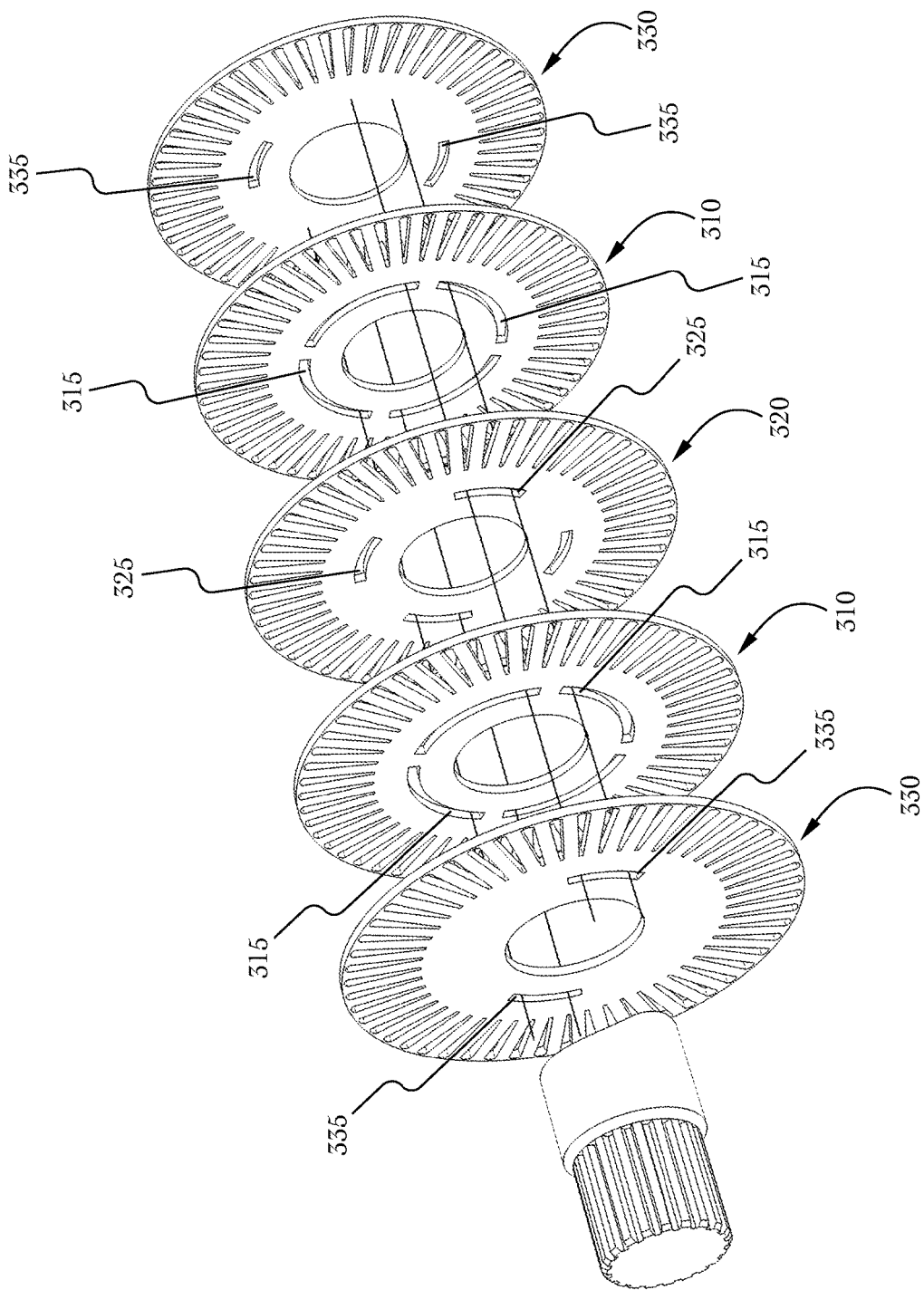
FIG. 4 is an exploded perspective view of the rotor core, according to an embodiment of the present invention.

As shown in FIGS. 2, 3a-c, and 4, rotor core 127 is composed of stacked magnetic laminations 310, 320, 330, each of which includes distributed apertures 315, 325, 335 which either fully or partly align to form fluid passages 210, 220 (FIG. 2). The rotor fluid passages 210, 220 may be collectively referred to as rotor fluid passages 139. FIG. 2 is a section view which illustrates schematically the fluid flow passages 139 used for the rotor core 127. In one embodiment, the rotor core 127 is composed of three types of lamination 310, 320, 330 (designated types 1, 2, and 3, respectively), having three respective aperture configurations. The laminations may be magnetic laminations. Type 3 laminations are used at the ends 240, 250 of the lamination stack and serve as "flow directors", while types 1 and 2 are stacked alternately within the end laminations. The apertures 315 of the type 1 laminations are aligned with each other and form passages 210, 220 that extend through the stack of laminations of types 1 and 2, and are substantially perpendicular to the laminations. Each of these passages (which are vertical in the orientation illustrated in FIG. 2) is partially blocked at every type 1 lamination 310 by a web 312 separating a pair of adjacent apertures 315 of the type 1 lamination 310. As shown in FIG. 2, a single type 3 lamination 330 (top end) 240 serves to direct inlet flow to a first set of passages (which may be referred to as "odd numbered passages") 210 within the stack, while at the opposite end (bottom end) 250 a single type 3 lamination 330 limits outlet flow to a second set of ("even numbered") passages 220. In the arrangement of FIG. 2, because none of the passages 210, 220 extend all the way through the stack, each fluid path or "fluid channel" 260 through the stack is axial (vertical, in FIG. 2) over portions of its length and also has a transverse (e.g., azimuthal, or horizontal, in FIG. 2) component 230 within the stack, as represented by the horizontal arrows. With this configuration, flow is thereby forced to flow from odd to even numbered passages through narrow regions 257 where heat transfer is highly efficient due to the short heat flow paths within the fluid. For these transverse regions of fluid flow, the width of each fluid channel is equal to one lamination thickness. As such, the characteristic heat flow distance is on the order of one fourth lamination thickness. Because of these very short heat flow distances, combined with the large total surface area associated with the narrow regions 257, high heat transfer between the laminations and the fluid can be achieved. Other elements, e.g., non-magnetic laminations, or features built into the manifolds may be used as flow directors instead of type 3 magnetic laminations. The stator core laminations may have similarly arranged apertures, as may the manifold coolers.

As used herein, a "flow director" is a structure that allows fluid to flow into, or out of, some, but not all, of the passages in a stack of laminations. A flow director may be a magnetic lamination as described above, with a set of apertures 335 overlapping some, but not all, of apertures of the type 1 laminations, or it may be a sheet of a non-magnetic material, e.g., aluminum, with similar apertures, or it may be a structure, integrated into a manifold, with similar apertures, or, for example, with protrusions 190 (FIG. 7d) that extend into one or more of the passages far enough to block one or more of the apertures of a type 1 lamination. As mentioned above, in some embodiments, the rotor 170 includes a rotor shaft 115, a rotor core 127, rotor manifolds 109, 155, and a rotor cage 159. The term "rotor body" is used herein to refer to the rotor core 127, the rotor manifolds 109, 155, and the rotor cage 159. An "end portion" of the rotor body, as used here, consists of a region in the vicinity of a respective extreme end of the rotor body. The rotor body thus has a "first end portion" which may include the front rotor manifold 109, and a "second end portion" which may include the rear rotor manifold 159.

In the terminology used herein, a first aperture and a second aperture that are in a first lamination and a second lamination respectively are said to "overlap" if the two laminations are adjacent and the two apertures overlap in the conventional sense, i.e., if there is an open path that extends through the first and the second aperture. For non-adjacent first and second laminations, a first aperture and a second aperture that are in the first lamination and the second lamination respectively are also said to "overlap" if the first aperture, projected axially onto the second lamination, overlaps the second aperture, i.e., if there is a straight line parallel to the axis of the motor that extends through both apertures.

As the number of apertures is increased, fluid flow paths are shortened and the head loss per unit flow rate is reduced while heat transfer may remain essentially constant. Thus, with an adequately large number of apertures, relatively low head loss can be achieved for a fluid such as automatic transmission fluid (ATF) 252 or transformer oil 255. Water, or a water-based solution 253 such as water mixed with additives such as ethylene glycol, may also be used as a cooling fluid. Water may have a higher specific heat capacity than other coolants. Such water-based cooling fluid may carry an increased risk of corrosion of the parts of the electric machine 100, but it may be possible to mitigate this risk using additives; moreover the risk may be acceptable in applications, e.g., race motors, in which long machine life is not required. In some cases, such as where very thin laminations are used, type 1 and type 2 laminations may be grouped. For example, the stack of laminations between the flow director may consist of alternating groups of two or three laminations, the laminations being the same within each group (i.e., stacked in the sequence—11, 22, 11—or in the sequence—111, 222, 111—, etc.). Groups of more than three laminations may also be used.

In the rotor, type 1 laminations 310 may have relatively wide fluid apertures 315, and may alternate, between two type 3 laminations 330, with type 2 laminations 320 which may have relatively narrow apertures 325, similar to the apertures 335 of the type 3 laminations 330.

Referring again to FIG. 1a, at the rear end of the rotor core 127, rear rotor manifold 155 receives fluid from shaft 115 which is then distributed radially outward to rotor fluid passages 139 within the rotor core 127. At the opposite end, front rotor manifold 109 directs received fluid radially inward to shaft 115. At the ends of the rotor stack, rotor flow directors 108, 158 direct inlet and outlet flow such that each fluid path between the inlet and outlet includes transverse flow.

In one embodiment, no flow directors are used and all lamination are identical, so that the flow within the rotor is simple axial flow. The laminations may for example all be of the type shown in FIG. 3a. While this embodiment may provide a lower heat transfer rate than that of the embodiment of, e.g., FIG. 4, it may cost less to produce. The proportion in which the fluid flows through the parallel fluid flow circuits for the rotor and the stator may be adjusted, for example, by suitable tailoring of the sizes of the lamination fluid apertures, or by other arrangements such as an orifice or other metering constriction in the fluid path of one or both of these fluid flow circuits.

Figure 5A:
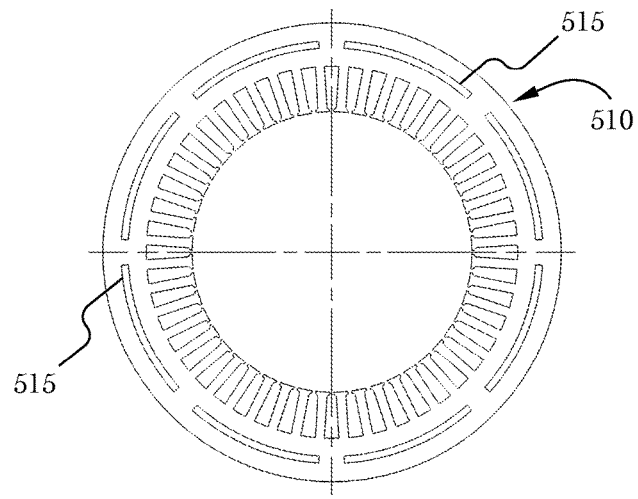
FIG. 5a is a plan view of a first stator lamination type, according to an embodiment of the present invention.
Figure 5B:
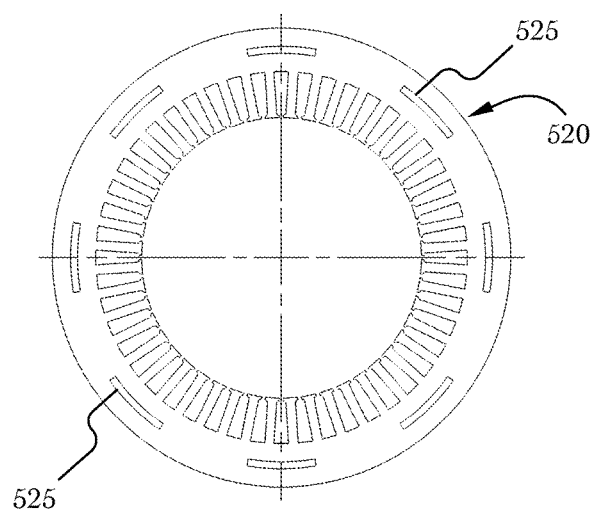
FIG. 5b is a plan view of a second stator lamination type, according to an embodiment of the present invention.
Figure 5C:
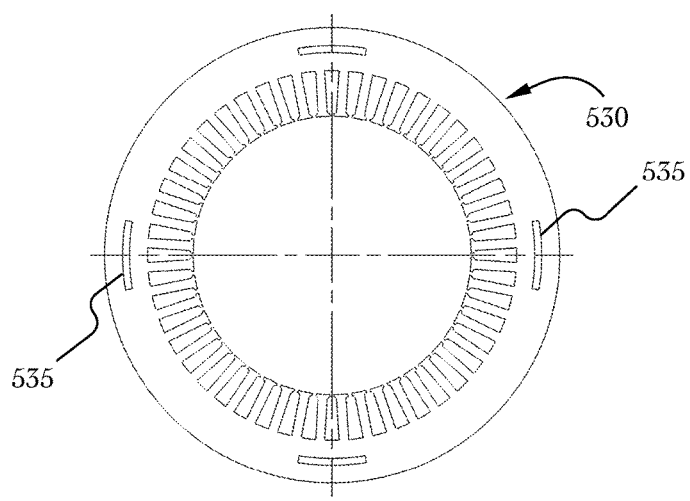
FIG. 5c is a plan view of a third stator lamination type, according to an embodiment of the present invention.
Figure 6A:
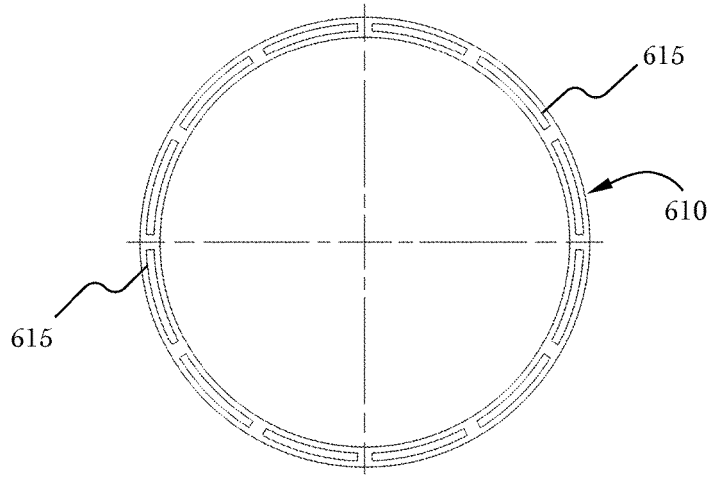
FIG. 6a is a plan view of a first stator manifold cooler lamination type, according to an embodiment of the present invention.
Figure 6B:
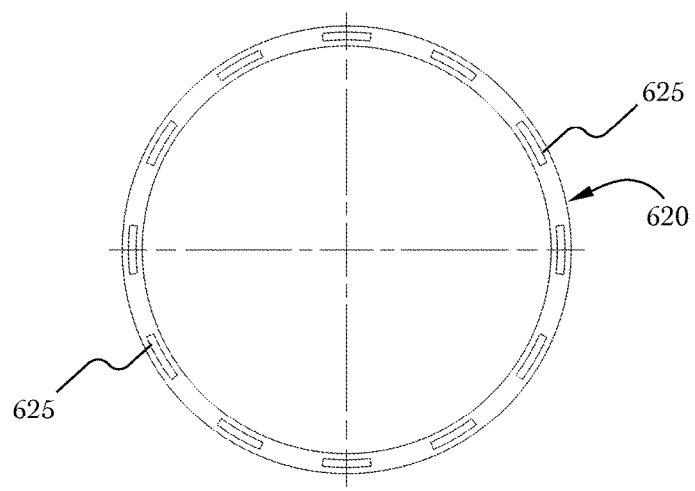
FIG. 6b is a plan view of a second stator manifold cooler lamination type, according to an embodiment of the present invention.
Figure 6C:
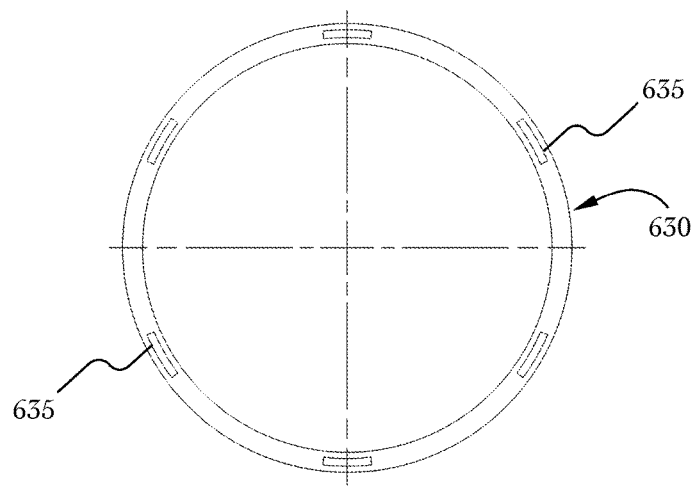
FIG. 6c is a plan view of a third stator manifold cooler lamination type, according to an embodiment of the present invention.

Referring to FIGS. 5a-c, in one embodiment stator core 101, like rotor core 127, is composed of stacked magnetic laminations, each of which includes distributed apertures which partly align (i.e., overlap) to form fluid channels. As is the case for the laminations of the rotor core 127, the laminations on the two ends of the stator core stack may be type 3 laminations 530 configured to act as flow directors, e.g., one type 3 lamination 530 being clocked relative to the other type 3 lamination 530 by one half of the angle between adjacent apertures of the type 3 laminations 530. The remainder of the lamination stack may be composed of two alternating lamination types, the first of which, the type 1 lamination 510, has an even number of relatively wide fluid apertures 515, and the second of which, the type 2 lamination 520, has an even number of relatively narrow fluid apertures 525. Each of the type 3 laminations 530 may have half as many fluid apertures 535 as the type 1 or type 2 laminations; the fluid apertures 535 of the type 3 laminations 530 may also be relatively narrow. In some embodiments the lamination stack is composed of identical laminations where the clocking is altered between adjacent laminations (or groups of laminations) such that the above described transverse cooling is still established. The heat transfer rate provided by such an embodiment may be lower than that of the case where two types of laminations are used which have different aperture widths.

In some embodiments, such as for large machines, the laminations may include two or more concentric sets of apertures. For example, each of the laminations may include a first set of apertures arranged on a first circle centered on a central axis of the lamination, and also a second set of apertures centered on a second circle, larger or smaller than, and concentric with, the first circle. The second set of apertures may contain the same number of apertures as the first set of apertures, and the apertures of the second set of apertures may be azimuthally aligned with the apertures of the first set of apertures. The first and second sets of apertures may form parts of separate fluid circuits within the part (e.g., within the stator, the rotor, or the manifold cooler) and the fluid circuits may be arranged to be in series or in parallel according to the configuration of the flow directors and of the external fluid connections to the flow directors. In some embodiments the apertures are not identical, but vary in size, shape, and/or orientation.

All of the stator laminations may include slots which fully align to form conventional winding slots. At the rear end of the stator core 101, rear stator manifold 135 receives fluid from inlet 133 which is then distributed to stator fluid passages 131. At the opposite end of the stator core 101, front stator manifold 103 directs fluid received from the stator core 101 to outlet 129. At the rear end of the stator core 101, rear stator flow director 134 directs fluid entry into the odd numbered stack apertures, while at the front end, front stator flow director 102 restricts fluid exit to even numbered stack apertures.

Referring again to FIG. 1a, in one embodiment, stator manifolds 103 and 135 are sealed to respective faces of stator core 101 such that fluid leakage does not occur. This can be achieved with the use of sealants, flat gaskets, O-rings, or other means. In one embodiment, the two stator manifolds and the two end bells have features (e.g., holes) to accommodate, and are drawn together with, tie rods (not shown).

Shaft rear axial hole 143 and rear radial holes 147, 151, located in the rear end of shaft 115, communicate fluid received from one or more rear end bell fluid channels 153 to one or more rear rotor manifold fluid channels 140 within rear rotor manifold 155. Likewise, front axial hole 119 and front radial holes 121, 125, located in the front end of shaft 115, communicate fluid received from one or more front rotor manifold fluid channels 126, to front end bell fluid channels 112. The shaft 115 may have one or more (e.g., four) radial holes at each axial location. Rear shaft plug 145 and front shaft plug 117 prevent fluid from exiting the shaft ends. Rear rotary shaft seals 149 constrain fluid received from rear end bell fluid channels 153 such that the flow is fully directed to rear radial holes 147. Likewise, front rotary shaft seals 113 constrain fluid received from shaft front radial holes 121 such that the flow is fully directed to front end bell fluid channels 112. In turn, rear end bell fluid channels 153 receive fluid flow from rear stator manifold fluid channel 161 via holes which align and seal. Likewise, front end bell fluid channels 112 return fluid flow to front stator manifold 103. The combinations of shaft seals, axial and radial shaft holes, and shaft plugs serve as rotary fluid couplings. In some embodiments, these functions are performed by external fluid couplings instead of as described above. As used herein, a "rotary fluid coupling" is defined to be a sealed coupling that allows fluid to flow from a fluid passage in a stationary part to a fluid passage in a rotating part.

Front and rear bearings 123, 141 may be conventional and may be sealed or lubricated by either the fluid used to cool the motor or a separate fluid. In cases where electrical power is provided by an unfiltered inverter, at least one of the bearings may be insulated such that high frequency circulating currents are prevented from flowing through the bearings. This may be achieved by using ceramic or hybrid ceramic bearings, or by using at least one bearing including an inner or an outer insulating sleeve.

The stator winding may be conventional. End turns may be brought into thermal contact with stator manifolds 103 and 135 for enhanced cooling. The thermal contact may be aided by the use of thermally conductive resins such as aluminum oxide-filled epoxies. As the thermal conductivity of the resin is increased (e.g., by the addition of conductivity-enhancing components), resin viscosity may increase, making penetration, during fabrication, of the resin into the winding 105 more difficult. This problem may be overcome by the use of a thermoplastic encapsulation technique; a mold may be used and the potting resin may be injected under pressure. With this approach, potting resins which have thermal conductivities in excess of 4.0 W/m/° C. may be effectively used (i.e., acceptably low void fractions may be achieved with such resins). A potting resin 165 may be used, for example, to insulate the winding 105 from the stator core 101 while filling a space between the winding 105 from the stator core 101, providing a good thermal path between them; the same resin may be applied by the same process to seal the interior surface of the stator core 101, so that fluid is prevented from leaking into the rotor cavity through inter-lamination gaps. The same resin 165 may also penetrate into the stator winding to fill any spaces within the stator winding, providing improved heat transfer within the winding. In one embodiment the thermal conductivity of the potting resin is between 0.4 W/m/° C. and 10.0 W/m/° C. The interior diameter of the stator manifold may have a sheet or coating of a dielectric material to electrically insulate the winding 105 from the stator manifold.

Heat transfer between the active portion of the winding 105 and the stator core 101 may also be increased. To this end, the use of a resin coating such as an epoxy powder coat (e.g., a thermoplastic coating) applied to the slot walls and the elimination of conventional slot liners may increase the rate of heat transfer. Furthermore, by allowing the above mentioned thermoplastic to penetrate throughout the active slot region, very high heat transfer can be achieved for the active winding element, as well as for the end turn. In one embodiment, slot liners, or slot liners with enhanced thermal conductivity, are used in the slots (instead of, or in addition to, a resin coating) to insulate the winding 105 electrically from the laminations while providing high heat transfer between the winding 105 and the stator core 101.

In one embodiment, the end turn cross section is maintained as a rectangle, as opposed to the conventional "bulge pattern". This allows for a simple manifold design with straight walls, while enabling the manifold to be easily installed after the winding 105 is completed. This design also enables improved heat transfer between the end turn and the stator manifold; this heat transfer may be further improved by providing (e.g., injecting) resin 165 to fill any gap between the stator manifold and the end turn. The stator manifold may include a top flange which may be brought into thermal contact with the top face of the end turn. For example, the stator manifold may include two short concentric tubular sections joined by an annular end element; the inner tube section may form the top flange that is in thermal contact with the end turn. This feature further improves heat transfer between the end turn and the fluid, while providing added protection for the winding 105.

Figure 7A:
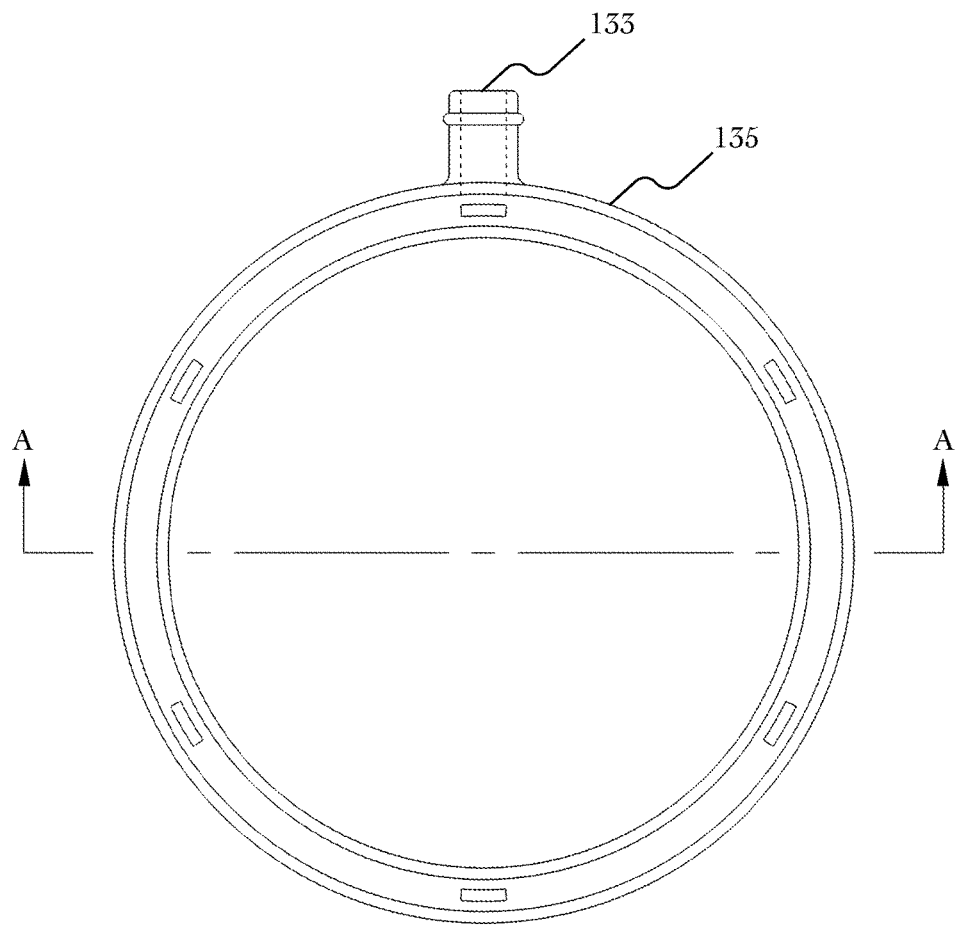
FIG. 7a is a plan view of a rear stator manifold including a stator manifold cooler, according to an embodiment of the present invention.
Figure 7B:
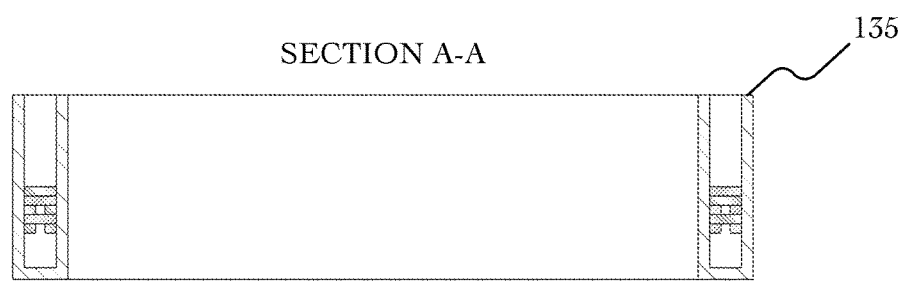
FIG. 7b is a section view of the stator manifold of FIG. 7a along the line A-A, according to an embodiment of the present invention.
Figure 7C:
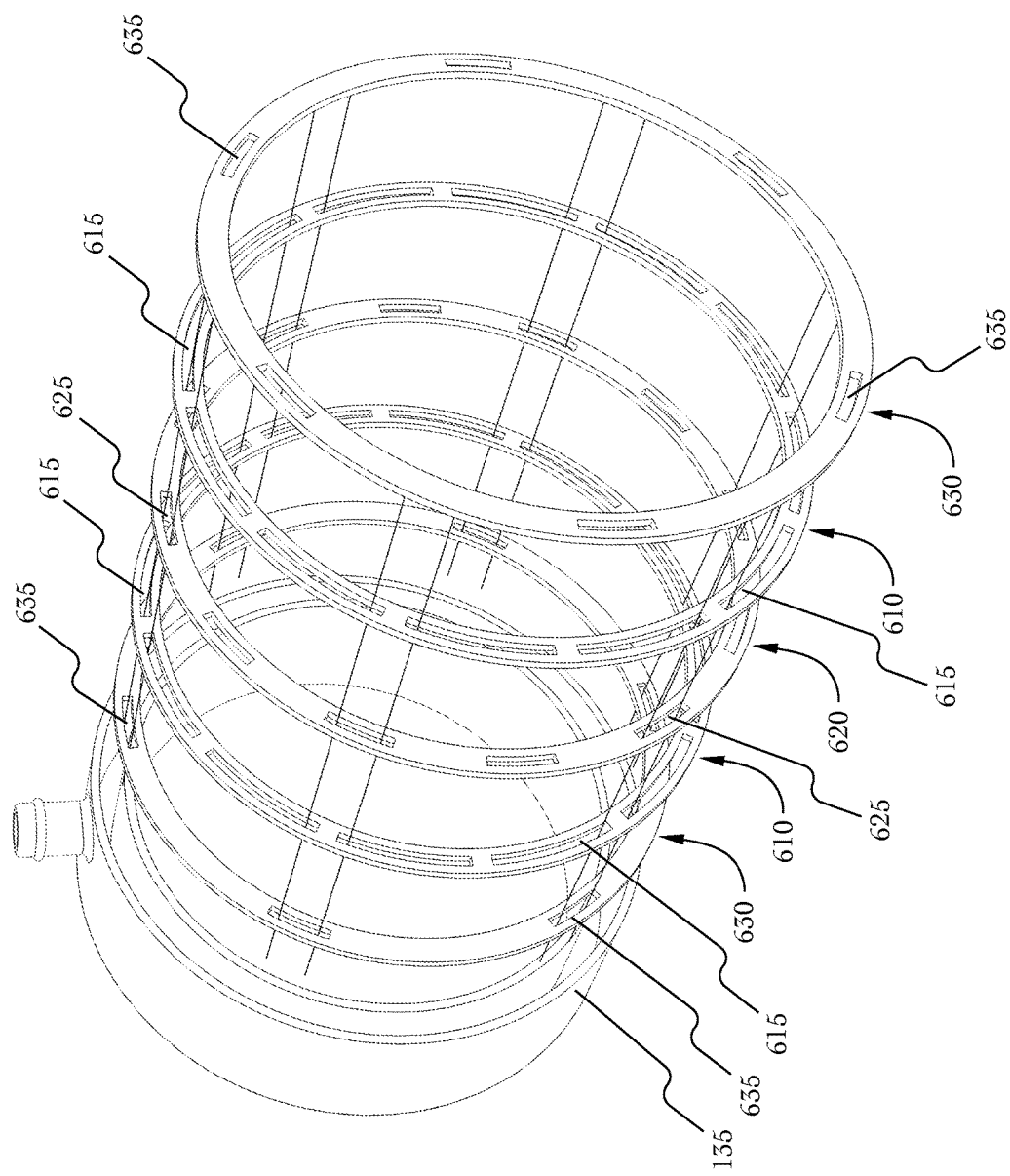
FIG. 7c is an exploded perspective view of a rear stator manifold with manifold cooler laminations, according to an embodiment of the present invention.
Figure 7D:
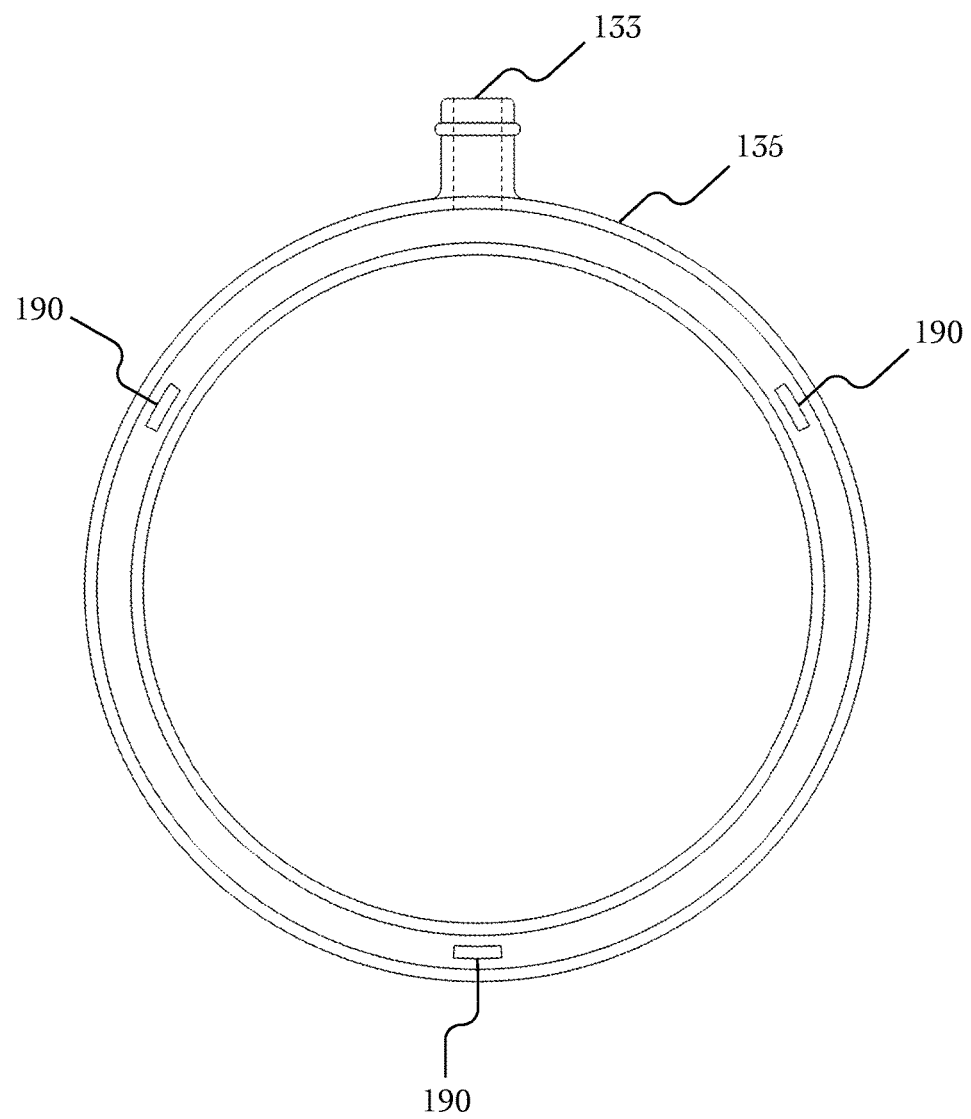
FIG. 7d is a plan view of a rear stator manifold showing protrusions forming a flow director, according to an embodiment of the present invention.

Referring to FIGS. 6*a*-*c* and 7*a*-*c*, a structure may be added within each stator manifold to enhance heat transfer between the walls of the manifold and the fluid. For example annular metallic (e.g., aluminum) laminations, having apertures similar to those used in both the rotor and stator cores, are stacked (and may be bonded together) to form manifold cooling elements (see FIGS. 6*a*-6*c* and 7*c*). The front element is referred to as the front stator manifold cooler 104, and the rear element is referred to as the rear stator manifold cooler 160. These elements may be press-fitted within stator manifold fluid channels 128 and 161 such that effective thermal contact is achieved between respective manifold coolers and manifolds. Like the rotor and stator cores, the manifold cooler may include a stack of alternating type 1 laminations 610 and type 2 laminations 620, between two type 3 laminations 630, the type 3 laminations 630 being clocked relative to each other to act as manifold cooler flow directors. Type 1 laminations 610 may have relatively wide fluid apertures 615, and type 2 laminations 620 and type 3 laminations 630 may have relatively narrow fluid apertures 625, 635. Fluid flow through these elements serves to efficiently remove heat transferred from the end turns through the stator manifold walls. Similar interior structures (e.g., sets of laminations) may be employed as rotor manifold coolers in the rotor manifolds 109, 155 to increase, for example, the heat flow from the end rings of the rotor cage 159 to the fluid. In FIGS. 1*a* and 7*b*, some details of the structure of the stator manifold coolers 104, 160 have been simplified and are shown schematically. For simplicity, the inlet 133 or outlet 129 of the stator manifold are not shown in FIGS. 7*b* and 7*c*. The front stator manifold 103 may be similar or identical to the rear stator manifold 135. FIG. 7*d* shows protrusions 190 in a rear stator manifold 135, the protrusions sized and positioned to block alternating apertures of a type 2 lamination of a stator manifold cooler. When protrusions 190 of this kind are used, the configuration of the lamination stack may differ from that of FIG. 2 in that the type 3 and type 1 laminations may be omitted from the end of the stack that engages the protrusions 190, so that the protrusions are able to engage (i.e., block) some (e.g., one half) of the apertures of the type 2 lamination that then forms the end of the stack.

Figure 8A:
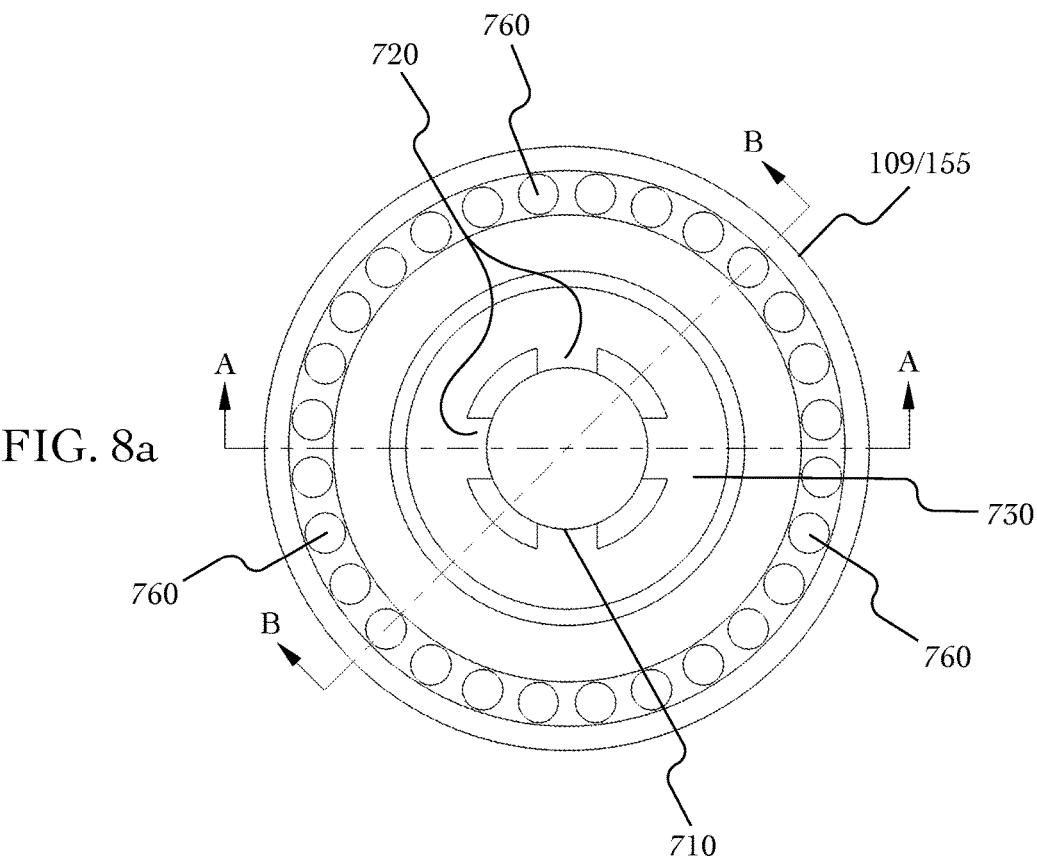
FIG. 8a is a plan view of a rotor manifold, according to an embodiment of the present invention.
Figure 8B:
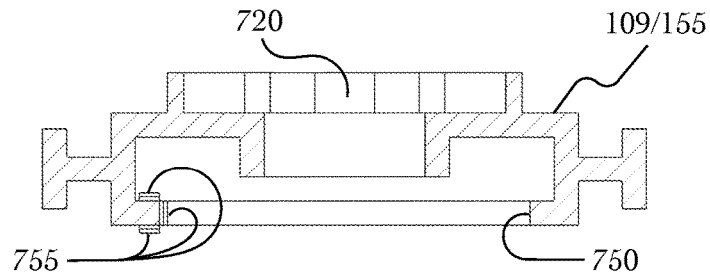
FIG. 8b is a section view of the rotor manifold of FIG. 8a along the line A-A, according to an embodiment of the present invention.
Figure 8C:
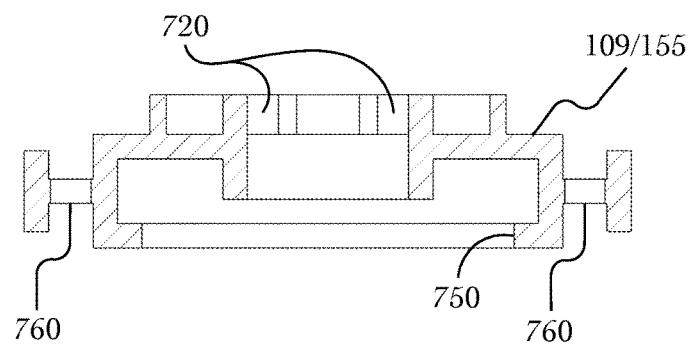
FIG. 8c is a section view of the rotor manifold of FIG. 8a along the line B-B, according to an embodiment of the present invention.

Referring to FIGS. 8*a*-*c*, a rotor manifold may have a central tubular portion forming a shaft hole 710. The central tubular portion may have cutouts 720 to allow fluid to flow between radial holes 125, 151 in the shaft 115 and the rotor manifold fluid channel 730. The rotor manifold may include a register 750, as shown in FIGS. 8*b* and 8*c*, top help secure balancing material such as balancing putty. One or more surfaces of the register 750 may have features 755 such as holes, projections or recesses, or the one or more surfaces may be roughened (i.e., the one or more surfaces may contain a plurality of small projections and recesses) to facilitate the securing of balancing putty to the register 750. The features 755 are shown schematically in FIG. 8*b*.

Figure 8D:
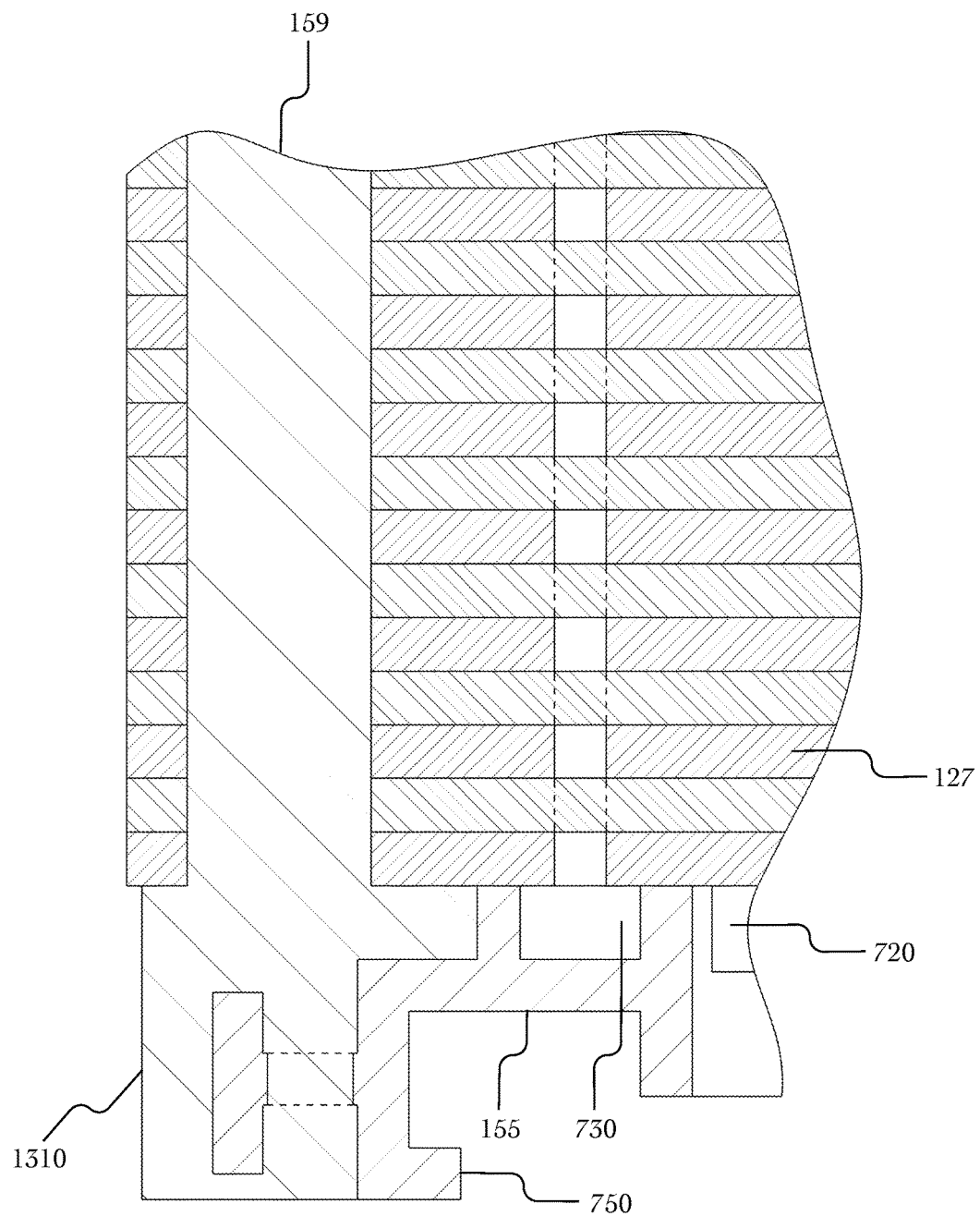
FIG. 8d is a breakaway cross-sectional view of a rotor, according to an embodiment of the present invention.
Figure 9:
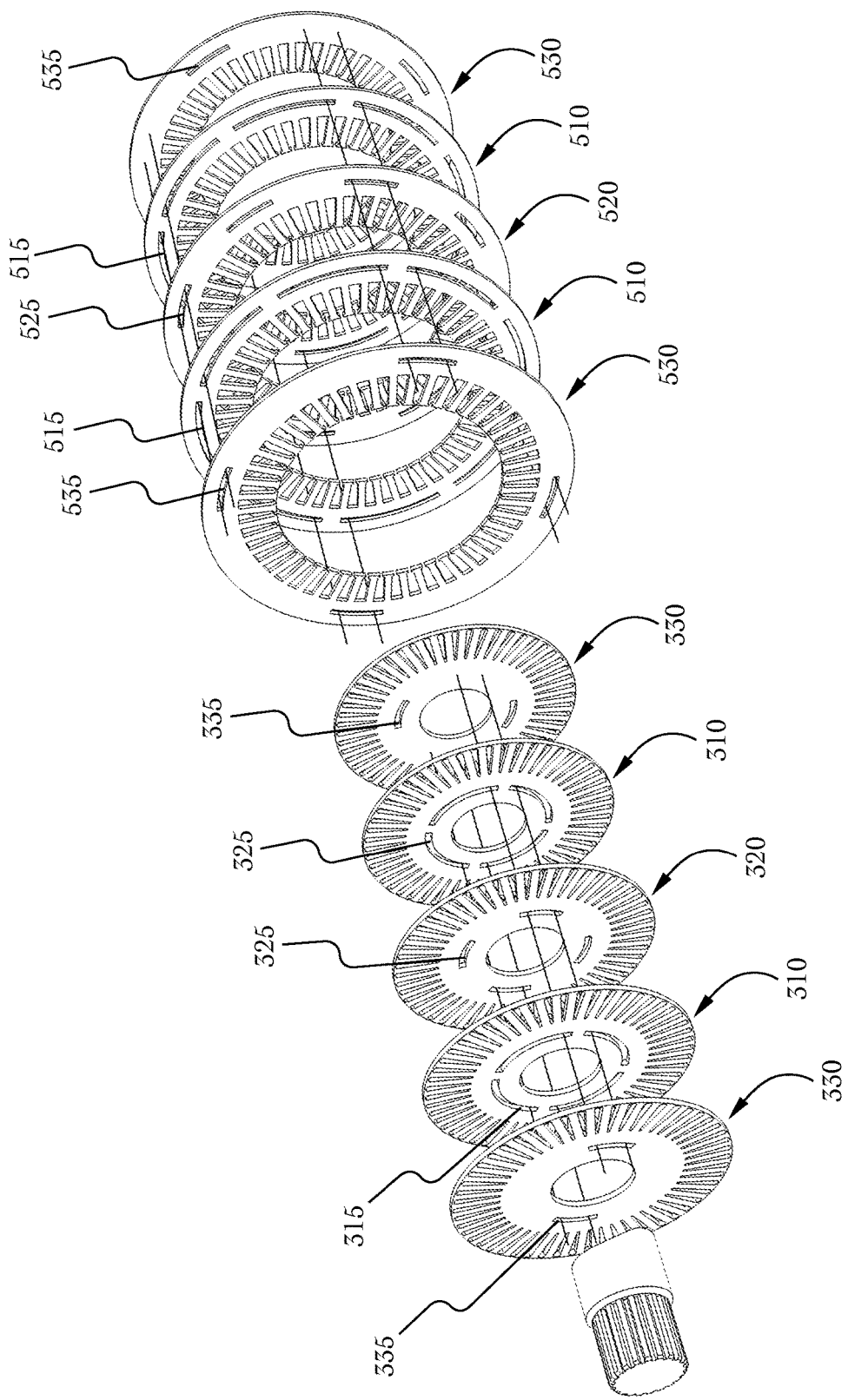
FIG. 9 is an exploded perspective view of a rotor core and stator core, according to an embodiment of the present invention.

Rotor cage 159 may be conventional and may be cast (e.g., aluminum or copper), or may be structured (e.g., copper). In one embodiment the rotor cage 159 is cast with the rotor manifold in place on the rotor core 127; the rotor manifold may have holes 760 that act as fluid paths for the molten metal during the casting process. These holes 760 in the rotor manifold may also anchor the rotor cage 159 to the rotor manifold after casting, increasing the strength of the rotor. Rotor manifolds 109, 155 (see FIGS. 8*a*-*c*) may include an outer rim or other feature which is contained within the end ring in the case where the rotor cage 159 is cast. This rim may provide added mechanical strength for the end ring, thus enabling increased rotational speeds without end ring failure. As shown in FIG. 8*d*, the rotor manifold may be inside the end ring 1310, and the feature extending into the end ring may include an annular portion and a tubular portion (having the shape of a "T" in cross section) extending into the end ring 1310, securing and cooling the end ring 1310. The proportions of the front or rear rotor manifold 109, 155 in the embodiment of FIG. 8*d* differ from those of the corresponding elements of FIG. 1*a*. Similarly, for example, the proportions of the stator manifold 135 in the embodiment of FIG. 7*a* differ from those of FIGS. 1*a* and 1*c*. As will be understood by one of skill in the art, such variations, as well as other variations in the proportions of components, are within the scope and spirit of the invention. FIG. 9 is an exploded perspective view of a rotor core and stator core.

Figure 10:
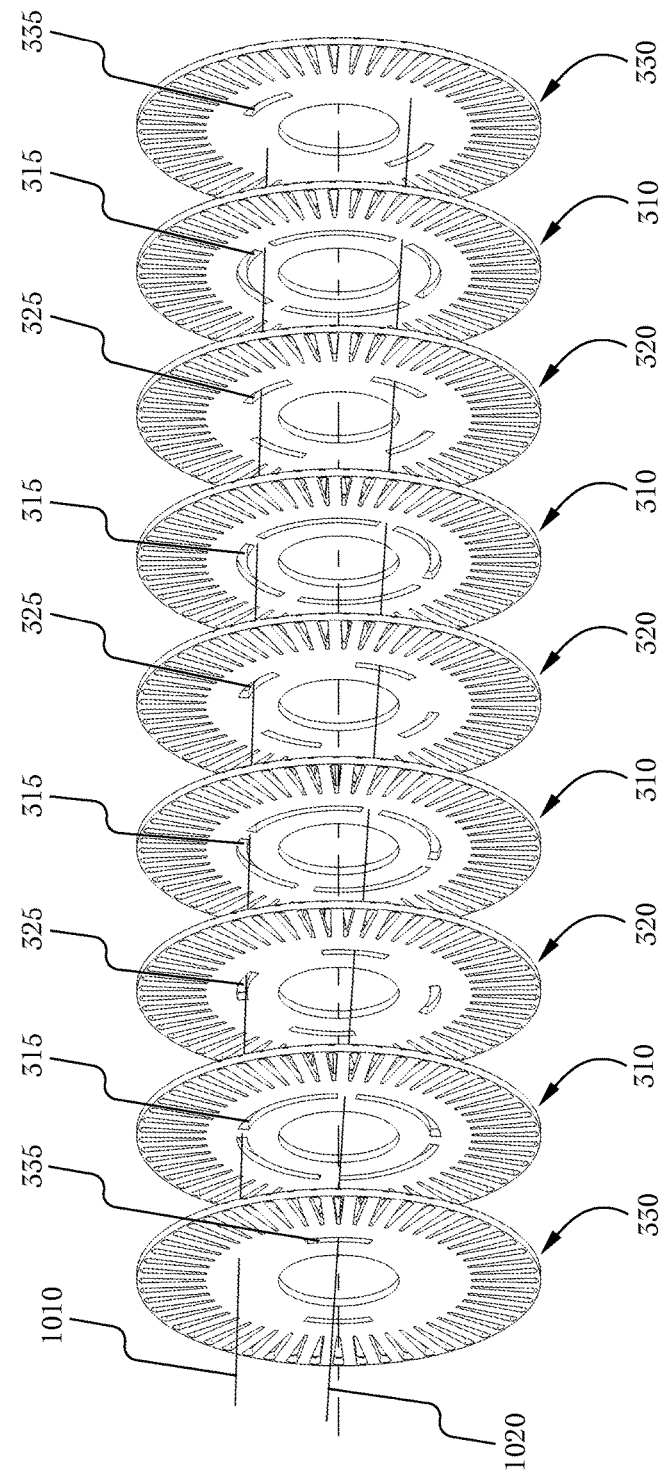
FIG. 10 is an exploded perspective view of a rotor core with helical fluid passages, according to an embodiment of the present invention.

Referring to FIG. 10, in some embodiments each lamination 310, 320, 330 of the rotor core may be clocked with respect to the adjacent laminations 310, 320, 330, so that the fluid passages 139 formed by apertures 325 of the type 2 laminations 320 are, instead of being straight, curved, forming helices coaxial with the central axis of the rotor, i.e., with the rotor shaft. For example, in the embodiment of FIG. 10, each aperture 325 falls on one of four such helices, of which two helices 1010, 1020 are identified in FIG. 10. The two apertures 335 of the front rotor flow director 330 fall onto two of the four helices, and the two apertures 335 of the rear rotor flow director 330 fall on the other two of the four helices. The pitch of the helices may be greater than or less than that shown in FIG. 10. In one embodiment the pitch is chosen to match that of a rotor cage with helical bars, and may correspond to clocking of ½ to 1½ of the inter-bar spacing over the length of the rotor. Similarly, in other embodiments the fluid passages of the stator or of one or both of the manifold coolers may be helical.

With some applications, functional elements of the disclosed induction machine 100 may be part of an associated element and vice versa. For example, in the case where the induction machine 100 drives a gear box, the gear pinion may be an integral part of the motor shaft 115, while the corresponding bearing is part of the gear box. In a like manner, it is possible that one or both of the fluid couplings or one or both stator manifolds are parts of external elements, such as gear boxes, inverters, or tandem machines. Moreover, although the electric machine 100 has been described as an induction motor, it may be, or be a part of, another machine, such as a DC brushless machine, a linear machine, or a machine including a gearbox. In one embodiment the electric machine is a permanent magnet machine with a permanent magnet rotor, and the stator includes some or all of the features described above. In one embodiment a gearbox that is part of or coupled to the electric machine includes, or supports, a stator manifold, an end bell, a bearing, and/or a fluid coupling. The rotor of the electric machine may be within the stator, as in the embodiment of FIG. 1*a*, or the electric machine may be constructed in an "inside out" configuration, in which the stator is within the rotor. Fluid apertures within any one lamination may be identical or different in shape and/or size, and a fluid aperture in one lamination may be identical to a fluid aperture in another lamination, or different, in shape and/or size, from a fluid aperture in another lamination. In one embodiment only the stator or only the rotor of the electric machine is cooled.

For both the stator and rotor cores, small gaps between the laminations, or "interlamination fissures", may cause fluid leakage. Several means are available for reducing such leakage. For both the stator and rotor, penetrating sealants may be externally applied and allowed to wick into interlamination fissures. For the stator, an external resin coat, such as an epoxy powder coat may be applied which serves as an "integrated enclosure". An enclosure 185 (FIG. 1a) may be a sleeve, e.g., an aluminum sleeve, placed over the stator and sealed to the stator manifolds or the end bells. The seal can be effected by an O-ring, a sealant 187, or a crimp. Finally, for any fluid leakage which enters the rotor cavity, a small scavenge pump 136 (FIG. 1a) may be used to return the leaked fluid to the main fluid circuit.

Example

A prototype four pole machine has been designed, fabricated and thermally tested. The approximate total mass of the machine is 12.2 kg; the stator mass, including manifolds and potting, is 7.3 kg; the rotor mass, including shaft, is 3.8 kg. The outer diameter is 6.2" and the overall length, excluding shaft projection is 6.1". The stator and rotor active stack height is 2.50". Lamination thickness is 0.010". Fluid flow and heat transfer data for both the stator and rotor is listed in Table 1.

TABLE 1

Stator and Rotor Data

| | |
|---|---|
| Stator fluid flow | 11 liters per minute |
| Stator head loss (ATF, 25° C.) | 7 psi |
| Stator heat dissipation | 254 W |
| ATF inlet temp. (steady state) | 28.4° C. |
| Back iron temp. | 29.3° C. |
| Temp. delta | 0.9° C. |
| Thermal impedance (cooling channels to ATF) | 0.0035° C./W |
| Rotor fluid flow | 5 liters per minute |
| Rotor head loss (ATF, 25° C.) | 7 psi |
| Rotor heat dissipation | 86 W |
| ATF inlet temp. (steady state) | 21.3° C. |
| Rotor surface temp. | 26.3° C. |
| Temp. delta | 5.0° C. |
| Thermal impedance (rotor surf. to ATF) | 0.058° C./W |
| Thermal impedance (rotor surface to cooling channels) | 0.044° C./W |
| Thermal impedance (cooling channels to ATF) | 0.014° C./W |

Although exemplary embodiments of an induction motor with transverse liquid cooled rotor and stator have been specifically described and illustrated herein, many modifications and variations will be apparent to those skilled in the art. Accordingly, it is to be understood that an induction motor with transverse liquid cooled rotor and stator constructed according to principles of this invention may be embodied other than as specifically described herein. The invention is also defined in the following claims, and equivalents thereof.

What is claimed is:

1. An electric machine, comprising:
   a stator;
   a rotor;
   and
   a rotary fluid coupling,
   the rotor having an axis of rotation and comprising:
      a shaft aligned with the axis of rotation; and
      a rotor body,
      the rotor body comprising a rotor core having a plurality of stacked magnetic laminations having a plurality of apertures overlapping to form a plurality of rotor fluid channels configured to carry a liquid from a first end portion of the rotor body to a second end portion of the rotor body,
      the rotary fluid coupling being in fluid communication with the rotor fluid channels,
   a first aperture of the plurality of apertures being partially aligned with an aperture of an adjacent lamination to define a portion of a first, substantially axial, fluid passage,
   a second aperture of the plurality of apertures being partially aligned with an aperture of an adjacent lamination to define a portion of a second, substantially axial, fluid passage,
   wherein a third fluid passage connects the first fluid passage and the second fluid passage, the third fluid passage not being parallel to the first fluid passage and the third fluid passage not being parallel to the second fluid passage,
   wherein the first aperture defines a fluid entrance at the first end portion of the rotor body,
   wherein the second aperture defines a fluid exit at the second end portion of the rotor body,
   wherein the second fluid passage is blocked at the first end portion of the rotor body, and/or the first fluid passage is blocked at the second end portion of the rotor body, such that a fluid path is established from the first fluid passage to the second fluid passage through the third fluid passage,
   the machine having an air space including an air gap between the rotor and the stator, the rotor being configured to prevent escape of liquid from the rotor into the air space.

2. The machine of claim 1, wherein the shaft has a fluid passage in fluid communication with the rotor fluid channels.

3. The machine of claim 1, wherein the stator has a stator winding and a stator core having a plurality of stacked magnetic laminations having a plurality of apertures overlapping to form a plurality of stator fluid channels, a stator fluid channel of the plurality of stator fluid channels being not entirely axial, and
   wherein the rotor and the stator are configured to form a magnetic circuit comprising the air gap.

4. The machine of claim 3, further comprising at least one of:
   a stator manifold, the stator manifold having a stator manifold fluid channel in fluid communication with the stator fluid channels, and
   a rotor manifold, the rotor manifold having a rotor manifold fluid channel in fluid communication with the rotor fluid channels.

5. The machine of claim 3, wherein:
   a lamination of the stator core comprises a third aperture and a fourth aperture, the third aperture differing in shape and/or in size from the fourth aperture, and/or
   a lamination of the rotor core comprises a third aperture and a fourth aperture, the third aperture differing in shape and/or in size from the fourth aperture.

6. The machine of claim 3, wherein at least one of the stator core and the rotor core comprises:
   a first lamination having a first axial orientation and a plurality of substantially identical apertures; and a second lamination having a second axial orientation and a plurality of substantially identical apertures,
wherein one of the apertures of the first lamination differs in shape and/or size from one of the apertures of the second lamination, and/or the first axial orientation differs from the second axial orientation.

7. The machine of claim 3, wherein each of the stator core and the rotor core comprises:
a first lamination having a first axial orientation and a plurality of substantially identical third apertures; and
a second lamination having a second axial orientation and a plurality of substantially identical fourth apertures,
wherein one of the third apertures differs in shape and/or size from one of the fourth apertures, and/or the first axial orientation differs from the second axial orientation.

8. The machine of claim 3, wherein at least one of the stator core and the rotor core comprises:
a first lamination having an aperture; and
a second lamination adjacent to the first lamination, the second lamination having an aperture differing in size and/or shape from the aperture of the first lamination.

9. The machine of claim 3, wherein at least one of the stator core and the rotor core comprises:
a first lamination; and
a second lamination adjacent to, substantially identical to, and having substantially the same axial orientation as, the first lamination.

10. The machine of claim 3, wherein:
a first lamination of the laminations of the stator is substantially identical to a second lamination of the laminations of the stator, and/or
a first lamination of the laminations of the rotor is substantially identical to a second lamination of the laminations of the rotor.

11. The machine of claim 3, further comprising a flow director secured to the stator core and/or a flow director secured to the rotor core.

12. The machine of claim 3, further comprising at least one of:
a flow director having a protrusion extending into an aperture of a lamination of the stator and
a flow director having a protrusion extending into an aperture of a lamination of the rotor.

13. The machine of claim 3, wherein:
the stator core comprises a first lamination at one end of the stator core and a second lamination, the first lamination having at least one aperture and the second lamination having at least one aperture not overlapping any aperture of the first lamination, and/or
the rotor core comprises a first lamination at one end of the rotor core and a second lamination, the first lamination having at least one aperture and the second lamination having at least one aperture not overlapping any aperture of the first lamination.

14. The machine of claim 3, wherein at least one of the stator core and the rotor core comprises:
a first lamination, having at least one aperture, at a first end of the core; and
a second lamination, having at least one aperture, at an end of the core opposite the first end,
the second lamination having an aperture not overlapping any aperture of the first lamination, and
the first lamination having an aperture not overlapping any aperture of the second lamination.

15. The machine of claim 3, further comprising a stator manifold, the stator manifold having a stator manifold fluid channel in fluid communication with the stator fluid channels,
wherein the stator core comprises an electrically insulating resin having a thermal conductivity greater than about 0.4 W/m/° C., the resin filling, with a void fraction less than about 10%:
a space between the stator core and the stator winding, and/or
a space between the stator manifold and an end turn of the stator winding, and/or
a space within the stator winding.

16. The machine of claim 3, further comprising a stator manifold, the stator manifold having a stator manifold fluid channel in fluid communication with the stator fluid channels,
wherein the stator manifold fluid channel is in fluid communication with the rotary fluid coupling.

17. The machine of claim 3, further comprising a stator manifold, the stator manifold having a stator manifold fluid channel in fluid communication with the stator fluid channels,
wherein the stator manifold fluid channel comprises a plurality of stacked stator manifold cooler laminations, and
wherein each of the stator manifold cooler laminations has a plurality of stator cooler apertures, the stator cooler apertures overlapping to form a plurality of stator manifold cooler fluid channels.

18. The machine of claim 17, wherein a stator manifold cooler fluid channel of the plurality of stator manifold cooler fluid channels is not entirely axial.

19. The machine of claim 1, further comprising:
a rotor manifold, the rotor manifold having a rotor manifold fluid channel in fluid communication with the rotor fluid channels,
wherein the rotor further comprises a rotor cage having a plurality of axial bars and two end rings, and
wherein the rotor manifold has a protrusion which is embedded within an end ring of the two end rings.

20. The machine of claim 19, wherein the rotor manifold has a protrusion, a recess, or a hole, configured to secure balancing material.

21. The machine of claim 1, further comprising:
a bearing configured to support an end of the shaft; and
an end bell configured to support the bearing,
wherein the bearing does not form a part of an electrically conductive path between the shaft and the end bell.

22. The machine of claim 3, wherein an external surface of the stator core and/or an external surface of the rotor core is sealed with a resin.

23. The machine of claim 3, further comprising an enclosure enclosing the stator core, the enclosure being configured to prevent leakage of fluid from the machine.

24. The machine of claim 3, further comprising a fluid in the stator fluid channels and in the rotor fluid channels, the fluid being selected from the group consisting of: automatic transmission fluids, transformer oils, and water-based solutions.

25. The machine of claim 1, further comprising a scavenge pump configured to return leaked fluid to a main fluid circuit.

26. The machine of claim 1, wherein the third fluid passage is perpendicular to the axis of rotation.

27. The machine of claim 1, wherein each of the first substantially axial fluid passage and the second substantially axial fluid passage has a length greater than one half a length of the rotor core.

28. An electric machine, comprising:
a rotor; and
a rotary fluid coupling,
the rotor having:
an axis of rotation;
a shaft aligned with the axis of rotation; and
a rotor core,
the rotor core having a plurality of stacked magnetic laminations having a plurality of apertures overlapping to form a plurality of rotor fluid channels configured to carry liquid, a rotor fluid channel of the plurality of rotor fluid channels being not entirely aligned with the axis of rotation,
the rotary fluid coupling being in fluid communication with the rotor fluid channels,
the rotor being configured to prevent escape of liquid from the rotor except through the rotary fluid coupling.

29. An electric machine, comprising:
a stator;
a rotor; and
a rotary fluid coupling,
the rotor having:
an axis of rotation,
a shaft aligned with the axis of rotation; and
a rotor core,
the rotor core having a plurality of stacked magnetic laminations having a plurality of apertures overlapping to form a plurality of rotor fluid channels configured to carry liquid, a rotor fluid channel of the plurality of rotor fluid channels being not entirely aligned with the axis of rotation,
the rotary fluid coupling being in fluid communication with the rotor fluid channels,
the machine having an air space including an air gap between the rotor and the stator, the rotor being configured to prevent escape of liquid from the rotor core directly into the air space.

30. The electric machine of claim 29, wherein the rotor is configured to prevent escape of liquid from the rotor into the air space.

31. The electric machine of claim 29, wherein:
the rotor core consists of n laminations, n being a whole number, each of the laminations having a plurality of apertures, the apertures overlapping to form a first substantially axial fluid passage and a second substantially axial fluid passage, each of the first substantially axial fluid passage and the second substantially axial fluid passage having a length greater than one half a length of the rotor core; and
the rotor core has k transverse fluid passages, k being a whole number greater than n/6, each of the transverse fluid passages being perpendicular to the axis of rotation and connecting the first substantially axial fluid passage and the second substantially axial fluid passage.

32. An electric machine, comprising:
a rotor;
a first rotary fluid coupling; and
a second rotary fluid coupling,
the rotor having:
an axis of rotation;
a shaft aligned with the axis of rotation; and
a rotor core,
the rotor core having a plurality of stacked magnetic laminations having a plurality of apertures overlapping to form a plurality of rotor fluid channels configured to carry liquid, a rotor fluid channel of the plurality of rotor fluid channels being not entirely aligned with the axis of rotation,
the first rotary fluid coupling being in fluid communication with the rotor fluid channels, and
the second rotary fluid coupling being in fluid communication with the rotor fluid channels.

33. The electric machine of claim 32, further comprising a stator, the machine having an air space including an air gap between the rotor and the stator, the rotor being configured to prevent escape of liquid from the rotor core directly into the air space.

34. The electric machine of claim 33, each fluid channel of the plurality of rotor fluid channels having a respective portion perpendicular to the axis of rotation and not parallel to the radial direction, the portion having an axial dimension of less than four lamination thicknesses.

35. The electric machine of claim 33, each fluid channel of the plurality of rotor fluid channels having a respective portion perpendicular to the axis of rotation and not parallel to the radial direction, the portion having an axial dimension of less than about 0.040 inches.

36. The electric machine of claim 32, wherein
a first fluid path includes:
a first substantially axial portion;
a portion perpendicular to the axis of rotation and not parallel to the radial direction; and
a second substantially axial portion,
the first fluid path being a fluid path from the first rotary fluid coupling, through the rotor, to the second rotary fluid coupling.

* * * * *